United States Patent
Berlin et al.

(10) Patent No.: US 9,602,210 B2
(45) Date of Patent: Mar. 21, 2017

(54) FLEXIBLE HEAD-END CHASSIS SUPPORTING AUTOMATIC IDENTIFICATION AND INTERCONNECTION OF RADIO INTERFACE MODULES AND OPTICAL INTERFACE MODULES IN AN OPTICAL FIBER-BASED DISTRIBUTED ANTENNA SYSTEM (DAS)

(71) Applicant: Corning Optical Communications Wireless Ltd, Airport City (IL)

(72) Inventors: Igor Berlin, Potomac, MD (US); William Patrick Cune, Charlotte, NC (US); Gavriel Mizrahi, Tel Aviv (IL)

(73) Assignee: Corning Optical Communications Wireless Ltd, Airport City (IL)

(*) Notice: Subject to any disclaimer, the term of this patent is extended or adjusted under 35 U.S.C. 154(b) by 0 days.

(21) Appl. No.: 14/855,896

(22) Filed: Sep. 16, 2015

(65) Prior Publication Data

US 2016/0087725 A1    Mar. 24, 2016

Related U.S. Application Data

(60) Provisional application No. 62/054,543, filed on Sep. 24, 2014.

(51) Int. Cl.
*H04B 10/2575* (2013.01)
*H04Q 11/00* (2006.01)

(52) U.S. Cl.
CPC ... *H04B 10/25753* (2013.01); *H04Q 11/0005* (2013.01); *H04Q 2011/0015* (2013.01)

(58) Field of Classification Search
CPC ......... H04B 10/25753; H04Q 11/0005; H04Q 2011/0015

(Continued)

(56) References Cited

U.S. PATENT DOCUMENTS

| 4,365,865 A | 12/1982 | Stiles |
| 4,449,246 A | 5/1984 | Seiler et al. |

(Continued)

FOREIGN PATENT DOCUMENTS

| AU | 645192 B | 10/1992 |
| AU | 731180 B2 | 3/1998 |

(Continued)

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.

(Continued)

*Primary Examiner* — Dalzid Singh
(74) *Attorney, Agent, or Firm* — C. Keith Montgomery

(57) ABSTRACT

Flexible head-end chassis supporting automatic identification and interconnection of radio interface modules (RIMs) and optical interface modules (OIMs) in an optical fiber-based distributed antenna system (DAS) are disclosed. In one embodiment, the flexible head-end chassis includes a plurality of module slots each configured to receive either a RIM or an OIM. A chassis control system identifies an inserted RIM or OIM to determine the type of module inserted. Based on the identification of the inserted RIM or OIM, the chassis control system interconnects the inserted RIM or OIM to related combiners and splitters in head-end equipment for the RIM or OIM to receive downlink communication signals and uplink communications signals for processing and distribution in the optical fiber-based DAS. In this manner, the optical fiber-based DAS can easily be configured or reconfigured with different combinations of RIMs and OIMs to support the desired communications services and/or number of remote units.

16 Claims, 9 Drawing Sheets

(58) Field of Classification Search
USPC .......................................................... 398/45
See application file for complete search history.

(56) References Cited

U.S. PATENT DOCUMENTS

| | | | |
|---|---|---|---|
| 4,573,212 A | 2/1986 | Lipsky | |
| 4,665,560 A | 5/1987 | Lange | |
| 4,867,527 A | 9/1989 | Dotti et al. | |
| 4,889,977 A | 12/1989 | Haydon | |
| 4,896,939 A | 1/1990 | O'Brien | |
| 4,916,460 A | 4/1990 | Powell | |
| 4,939,852 A | 7/1990 | Brenner | |
| 4,972,346 A | 11/1990 | Kawano et al. | |
| 5,039,195 A | 8/1991 | Jenkins et al. | |
| 5,042,086 A | 8/1991 | Cole et al. | |
| 5,056,109 A | 10/1991 | Gilhousen et al. | |
| 5,059,927 A | 10/1991 | Cohen | |
| 5,125,060 A | 6/1992 | Edmundson | |
| 5,187,803 A | 2/1993 | Sohner et al. | |
| 5,189,718 A | 2/1993 | Barrett et al. | |
| 5,189,719 A | 2/1993 | Coleman et al. | |
| 5,206,655 A | 4/1993 | Caille et al. | |
| 5,208,812 A | 5/1993 | Dudek et al. | |
| 5,210,812 A | 5/1993 | Nilsson et al. | |
| 5,260,957 A | 11/1993 | Hakimi | |
| 5,263,108 A | 11/1993 | Kurokawa et al. | |
| 5,267,122 A | 11/1993 | Glover et al. | |
| 5,268,971 A | 12/1993 | Nilsson et al. | |
| 5,278,690 A | 1/1994 | Vella-Coleiro | |
| 5,278,989 A | 1/1994 | Burke et al. | |
| 5,280,472 A | 1/1994 | Gilhousen et al. | |
| 5,299,947 A | 4/1994 | Barnard | |
| 5,301,056 A | 4/1994 | O'Neill | |
| 5,325,223 A | 6/1994 | Bears | |
| 5,339,058 A | 8/1994 | Lique | |
| 5,339,184 A | 8/1994 | Tang | |
| 5,343,320 A | 8/1994 | Anderson | |
| 5,377,035 A | 12/1994 | Wang et al. | |
| 5,379,455 A | 1/1995 | Koschek | |
| 5,381,459 A | 1/1995 | Lappington | |
| 5,396,224 A | 3/1995 | Dukes et al. | |
| 5,400,391 A | 3/1995 | Emura et al. | |
| 5,420,863 A | 5/1995 | Taketsugu et al. | |
| 5,424,864 A | 6/1995 | Emura | |
| 5,444,564 A | 8/1995 | Newberg | |
| 5,457,557 A | 10/1995 | Zarem et al. | |
| 5,459,727 A | 10/1995 | Vannucci | |
| 5,469,523 A | 11/1995 | Blew et al. | |
| 5,519,830 A | 5/1996 | Opoczynski | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,606,725 A | 2/1997 | Hart | |
| 5,615,034 A | 3/1997 | Hori | |
| 5,627,879 A | 5/1997 | Russell et al. | |
| 5,640,678 A | 6/1997 | Ishikawa et al. | |
| 5,642,405 A | 6/1997 | Fischer et al. | |
| 5,644,622 A | 7/1997 | Russell et al. | |
| 5,648,961 A | 7/1997 | Ebihara | |
| 5,651,081 A | 7/1997 | Blew et al. | |
| 5,657,374 A | 8/1997 | Russell et al. | |
| 5,668,562 A | 9/1997 | Cutrer et al. | |
| 5,677,974 A | 10/1997 | Elms et al. | |
| 5,682,256 A | 10/1997 | Motley et al. | |
| 5,694,232 A | 12/1997 | Parsay et al. | |
| 5,703,602 A | 12/1997 | Casebolt | |
| 5,708,681 A | 1/1998 | Malkemes et al. | |
| 5,726,984 A | 3/1998 | Kubler et al. | |
| 5,765,099 A | 6/1998 | Georges et al. | |
| 5,790,536 A | 8/1998 | Mahany et al. | |
| 5,790,606 A | 8/1998 | Dent | |
| 5,793,772 A | 8/1998 | Burke et al. | |
| 5,802,173 A | 9/1998 | Hamilton-Piercy et al. | |
| 5,802,473 A | 9/1998 | Rutledge et al. | |
| 5,805,975 A | 9/1998 | Green, Sr. et al. | |
| 5,805,983 A | 9/1998 | Naidu et al. | |
| 5,809,395 A | 9/1998 | Hamilton-Piercy et al. | |
| 5,809,431 A | 9/1998 | Bustamante et al. | |
| 5,812,296 A | 9/1998 | Tarusawa et al. | |
| 5,818,619 A | 10/1998 | Medved et al. | |
| 5,818,883 A | 10/1998 | Smith et al. | |
| 5,821,510 A | 10/1998 | Cohen et al. | |
| 5,825,651 A | 10/1998 | Gupta et al. | |
| 5,838,474 A | 11/1998 | Stilling | |
| 5,839,052 A | 11/1998 | Dean et al. | |
| 5,852,651 A | 12/1998 | Fischer et al. | |
| 5,854,986 A | 12/1998 | Dorren et al. | |
| 5,859,719 A | 1/1999 | Dentai et al. | |
| 5,862,460 A | 1/1999 | Rich | |
| 5,867,485 A | 2/1999 | Chambers et al. | |
| 5,867,763 A | 2/1999 | Dean et al. | |
| 5,881,200 A | 3/1999 | Burt | |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | |
| 5,943,372 A | 8/1999 | Gans et al. | |
| 5,946,622 A | 8/1999 | Bojeryd | |
| 5,949,564 A | 9/1999 | Wake | |
| 5,953,670 A | 9/1999 | Newson | |
| 5,959,531 A | 9/1999 | Gallagher, III et al. | |
| 5,960,344 A | 9/1999 | Mahany | |
| 5,969,837 A | 10/1999 | Farber et al. | |
| 5,983,070 A | 11/1999 | Georges et al. | |
| 5,987,303 A | 11/1999 | Dutta et al. | |
| 6,005,884 A | 12/1999 | Cook et al. | |
| 6,006,069 A | 12/1999 | Langston | |
| 6,006,105 A | 12/1999 | Rostoker et al. | |
| 6,011,980 A | 1/2000 | Nagano et al. | |
| 6,014,546 A | 1/2000 | Georges et al. | |
| 6,016,426 A | 1/2000 | Bodell | |
| 6,023,625 A | 2/2000 | Myers, Jr. | |
| 6,037,898 A | 3/2000 | Parish et al. | |
| 6,061,161 A | 5/2000 | Yang et al. | |
| 6,069,721 A | 5/2000 | Oh et al. | |
| 6,088,381 A | 7/2000 | Myers, Jr. | |
| 6,118,767 A | 9/2000 | Shen et al. | |
| 6,122,529 A | 9/2000 | Sabat, Jr. et al. | |
| 6,127,917 A | 10/2000 | Tuttle | |
| 6,128,470 A | 10/2000 | Naidu et al. | |
| 6,128,477 A | 10/2000 | Freed | |
| 6,148,041 A | 11/2000 | Dent | |
| 6,150,921 A | 11/2000 | Werb et al. | |
| 6,157,810 A | 12/2000 | Georges et al. | |
| 6,192,216 B1 | 2/2001 | Sabat, Jr. et al. | |
| 6,194,968 B1 | 2/2001 | Winslow | |
| 6,212,397 B1 | 4/2001 | Langston et al. | |
| 6,222,503 B1 | 4/2001 | Gietema | |
| 6,223,201 B1 | 4/2001 | Reznak | |
| 6,232,870 B1 | 5/2001 | Garber et al. | |
| 6,236,789 B1 | 5/2001 | Fitz | |
| 6,236,863 B1 | 5/2001 | Waldroup et al. | |
| 6,240,274 B1 | 5/2001 | Izadpanah | |
| 6,246,500 B1 | 6/2001 | Ackerman | |
| 6,268,946 B1 | 7/2001 | Larkin et al. | |
| 6,275,990 B1 | 8/2001 | Dapper et al. | |
| 6,279,158 B1 | 8/2001 | Geile et al. | |
| 6,286,163 B1 | 9/2001 | Trimble | |
| 6,292,673 B1 | 9/2001 | Maeda et al. | |
| 6,295,451 B1 | 9/2001 | Mimura | |
| 6,301,240 B1 | 10/2001 | Slabinski et al. | |
| 6,307,869 B1 | 10/2001 | Pawelski | |
| 6,314,163 B1 | 11/2001 | Acampora | |
| 6,317,599 B1 | 11/2001 | Rappaport et al. | |
| 6,323,980 B1 | 11/2001 | Bloom | |
| 6,324,391 B1 | 11/2001 | Bodell | |
| 6,330,241 B1 | 12/2001 | Fort | |
| 6,330,244 B1 | 12/2001 | Swartz et al. | |

(56) References Cited

U.S. PATENT DOCUMENTS

| | | |
|---|---|---|
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Martin et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 * | 10/2004 | Schwartz ......... H04B 10/25755 398/115 |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B2 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |

(56) References Cited

U.S. PATENT DOCUMENTS

| | | |
|---|---|---|
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,213,401 B2 | 7/2012 | Fischer et al. |
| 8,223,795 B2 | 7/2012 | Cox et al. |
| 8,235,349 B1 | 8/2012 | Conklin et al. |
| 8,238,463 B1 | 8/2012 | Arslan et al. |
| 8,270,387 B2 | 9/2012 | Cannon et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,385,850 B1 | 2/2013 | Thompson et al. |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,737,454 B2 | 5/2014 | Wala et al. |

(56) References Cited

U.S. PATENT DOCUMENTS

| | | |
|---|---|---|
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |

(56) References Cited

U.S. PATENT DOCUMENTS

| | | |
|---|---|---|
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |

(56) References Cited

U.S. PATENT DOCUMENTS

| | | |
|---|---|---|
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268449 A1* | 11/2011 | Berlin .............. H04B 10/25753 398/115 |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2014/0016583 A1 | 1/2014 | Smith |
| 2014/0022914 A1* | 1/2014 | Leimeister ............ H04W 24/00 370/248 |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A | 3/2003 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2010090999 A1 | 8/2010 |
| WO | 2010132739 A1 | 11/2010 |
| WO | 2011023592 A1 | 3/2011 |
| WO | 2011100095 A1 | 8/2011 |
| WO | 2011139939 A1 | 11/2011 |

(56) References Cited

FOREIGN PATENT DOCUMENTS

| WO | 2012148938 A1 | 11/2012 |
|---|---|---|
| WO | 2012148940 A1 | 11/2012 |
| WO | 2013122915 A1 | 8/2013 |

OTHER PUBLICATIONS

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Author Unknown, "Suspended Ceiling T Wireless Access Point & DAS rem," Oberon Product Catalog, Jun. 4, 2014, 6 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, Date Unknown, 11 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local oscillator Signal," IEEE Photonics Technology Letters, vol. 20, No. 7, Apr. 1, 2008, pp. 478-480.
Attygalle et al., "Extending Optical Transmission Distance in Fiber Wireless Links Using Passive Filtering in conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Hang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Duantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.

(56) References Cited

OTHER PUBLICATIONS

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Author Unknown, "VCSEL Chaotic Synchronization and Modulation Characteristics," Master's Thesis, Southwest Jiatong University, Professor Pan Wei, Apr. 2006, 8 pages (machine translation).

Chowdhury et al., "Multi-service Multi-carrier Broadband MIMO Distributed Antenna Systems for In-building Optical Nireless Access," Presented at the 2010 Conference on Optical Fiber Communication and National Fiber Optic Engineers Conference, Mar. 21-25, 2010, San Diego, California, IEEE, pp. 1-3.

\* cited by examiner

FLEXIBLE HEAD-END CHASSIS SUPPORTING AUTOMATIC IDENTIFICATION AND INTERCONNECTION OF RADIO INTERFACE MODULES AND OPTICAL INTERFACE MODULES IN AN OPTICAL FIBER-BASED DISTRIBUTED ANTENNA SYSTEM (DAS)

PRIORITY APPLICATION

This application claims the benefit of priority under 35 U.S.C. §119 of U.S. Provisional Application No. 62/054,543, filed on Sep. 24, 2014, the content of which is relied upon and incorporated herein by reference in its entirety.

BACKGROUND

The technology of the present disclosure relates generally to an optical fiber-based distributed antenna system (DAS), and more particularly to a flexible head-end chassis that includes a plurality of module slots each configured to flexibly receive either a radio interface module (RIM) or an optical interface module (OIM), and provide automatic identification and interconnection of the received RIM or OIM in the optical-fiber based DAS.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station unit 18. If the DAS 12 is a broadband DAS, the central unit 16 receives downlink communications signals 20D in multiple frequency bands for different communications services from the base station 18 to be distributed to the remote antenna units 14(1)-14(N). The remote antenna units 14(1)-14(N) are configured to receive downlink communications signals 20D from the central unit 16 over a communications medium 22 to be distributed as downlink communications signals 20D to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the downlink communications signals 20D to client devices 26 within their respective coverage areas 10(1)-10(N). The remote antenna units 14(1)-14(N) in the DAS 12 are also configured to receive uplink communications signals 20U in multiple frequency bands from the client devices 26 in their respective coverage areas 10(1)-10(N). The uplink communications signals 20U can be filtered, amplified, and/or combined together into the combined uplink communications signals 20U to be distributed to the central unit 16, and separated into respective bands to distribute to the base station 18.

Optical fiber can also be employed in the DAS 12 in FIG. 1 to communicatively couple the central unit 16 to the remote antenna units 14(1)-14(N) for distribution of the downlink communications signals 20D and the uplink communications signals 20U. Benefits of optical fibers include extremely wide bandwidth and low noise operation. In this regard, FIG. 2 is a schematic diagram of an exemplary optical fiber-based DAS 30 (hereinafter "DAS 30"). The DAS 30 in this example is comprised of three (3) main components. One or more radio interfaces provided in the form of radio interface modules (RIMs) 32(1)-32(M) are provided in a central unit 34 to receive and process received electrical downlink communications signals 36D(1)-36D(R) prior to optical conversion into optical downlink communications signals. The notations "1-R" and "1-M" indicate that any number of the referenced component, 1-R and 1-M, respectively, may be provided. Each RIM 32(1)-32(M) can be designed to support a particular type of radio source or range of radio sources (i.e., frequencies) to provide flexibility in configuring the central unit 34 and the DAS 30 to support the desired radio sources. The electrical downlink communications signals 36D(1)-36D(R) are provided from the RIMs 32(1)-32(M) to a plurality of optical interfaces provided in the form of optical interface modules (OIMs) 38(1)-38(N). The OIMs 38(1)-38(N) each include electrical-to-optical (E/O) converters (not shown) to convert the electrical downlink communications signals 36D(1)-36D(R) into the downlink optical communications signals 40D(1)-40D(R). The optical downlink communications signals 40D(1)-40D(R) are communicated over optical downlink fiber communications medium 42D to a plurality of remote units 44(1)-44(S), which may be remote antenna units. The notation "1-S" indicates that any number of the referenced component, 1-S, may be provided. Optical-to-electrical (O/E) converters (not shown) provided in the remote units 44(1)-44(S) convert the optical downlink communications signals 40D(1)-40D(R) back into the electrical downlink communications signals 36D(1)-36D(R), which are provided to antennas 48(1)-48(S) in the remote units 44(1)-44(S) to client devices (not shown) in the reception range of the antennas 48(1)-48(S).

With continuing reference to FIG. 2, E/O converters (not shown) are also provided in the remote units 44(1)-44(S) to convert received electrical uplink communications signals 50U(1)-50U(S) received from client devices (not shown) through the antennas 48(1)-48(S) into optical uplink communications signals 40U(1)-40U(S). The remote units 44(1)-44(S) communicate the optical uplink communications signals 40U(1)-40U(S) over an uplink optical fiber communications medium 42U to the OIMs 38(1)-38(N) in the central unit 34. The OIMs 38(1)-38(N) include O/E converters (not shown) that convert the received uplink optical communications signals 40U(1)-40U(S) into electrical uplink communications signals 52U(1)-52U(S), which are processed by the RIMs 32(1)-32(M) and provided as electrical uplink communications signals 52U(1)-52U(S). The central unit 34 may provide the electrical uplink communications signals 52U(1)-52U(S) to a base station or other communications system.

With continuing reference to FIG. 2, the central unit 34 includes a dedicated RIM chassis 54 configured to house and support the RIMs 32(1)-32(M) and a dedicated OIM chassis 56 to house and support the OIMs 38(1)-38(N) as modular components. For example, the RIMs 32(1)-32(M) may be provided as circuit board cards that can be installed in circuit board card slots in the RIM chassis 54. When the RIMs 32(1)-32(M) are fully inserted in the RIM chassis 54, the RIMs 32(1)-32(M) connect to a backplane that provides interconnectivity within the optical fiber-based DAS 30. The OIMs 38(1)-38(N) may also be provided as circuit board cards that can be installed in circuit board card slots in the OIM chassis 56. When the OIMs 38(1)-38(N) are fully inserted in the OIM chassis 56, the OIMs 38(1)-38(N) connect to a backplane that provides interconnectivity within the optical fiber-based DAS 30. The number of RIMs 32(1)-32(M) provided in the central unit 34 is based on the number of communications services and/or remote units to be supported in the optical fiber-based DAS 30. The number of OIMs 38(1)-38(M) provided in the central unit 34 is based on the number of remote units 44(1)-44(S) supported by the optical fiber-based DAS 30. It may be desired to change the configuration of the optical fiber-based DAS 30 such that more RIMs 32(1)-32(M) or OIMs 38(1)-38(N) need to be provided in the central unit 34. However, if the RIM chassis 54 or OIM chassis 56 is full, it is not possible to install additional RIMs 32(1)-32(M) or OIMs 38(1)-38(N), respectively, without reconfiguring the optical fiber-based DAS 30, such as by providing additional chassis.

No admission is made that any reference cited herein constitutes prior art. Applicant expressly reserves the right to challenge the accuracy and pertinency of any cited documents.

SUMMARY

Embodiments disclosed herein include flexible head-end chassis supporting automatic identification and interconnection of radio interface modules (RIMs) and optical interface modules (OIMs) in an optical fiber-based distributed antenna system (DAS). Related methods and DASs are also disclosed. The flexible head-end chassis is provided as part of head-end equipment in an optical fiber-based DAS. In one embodiment, the flexible head-end chassis includes a plurality of module slots. Each of the module slots is configured to receive either a RIM or an OIM. The flexible head-end chassis includes a backplane configured to be interconnected with a RIM or OIM fully inserted into a module slot of the flexible head-end chassis. When a RIM or OIM is inserted into a module slot of the flexible head-end chassis and interconnected to the backplane, a chassis control system identifies the inserted RIM or OIM to determine which type of module is inserted in the module slot. Based on the identification of the inserted RIM or OIM, the chassis control system interconnects the inserted RIM or OIM to related signal routing circuitry (e.g., combiners and splitters) in the head-end equipment needed for the RIM or OIM to be capable of receiving downlink communications signals and uplink communications signals for processing and distribution in the optical fiber-based DAS. In this manner, the optical fiber-based DAS can easily be configured or reconfigured with different numbers and combinations of RIMs and OIMs, as needed or desired, for the optical fiber-based DAS to support the desired communications services and/or number of remote units.

One embodiment of the disclosure relates to a head-end chassis for an optical fiber-based DAS. The head-end chassis comprises a housing. The head-end chassis also comprises a plurality of module slots disposed in the housing. Each module slot among the plurality of module slots is configured to receive a connected module comprised of a radio interface module (RIM) or an optical interface module (OIM). The head-end chassis also comprises a backplane disposed in the housing. The backplane comprises a plurality of backplane interconnects each associated with a module slot among the plurality of module slots, each backplane interconnect among the plurality of backplane interconnects configured to interconnect with the connected module inserted into the module slot associated with the backplane interconnect. Each backplane interconnect among the plurality of backplane interconnects comprises a backplane downlink input configured to receive an electrical downlink communications signal from a RIM, a backplane downlink output configured to provide an electrical split downlink communications signal to an OIM, a backplane uplink input configured to receive an electrical uplink communications signal from an OIM, and a backplane uplink output configured to provide an electrical split uplink communications signal to a RIM. The backplane also comprises a plurality of combiner downlink inputs each corresponding to a backplane interconnect among the plurality of backplane interconnects. The plurality of combiner downlink inputs is configured to receive a plurality of electrical downlink communications signals from a plurality of RIMs, combine the received plurality of electrical downlink communications signals into an electrical combined downlink communications signal, and provide the electrical combined downlink communications signal on a combiner downlink output. The backplane also comprises a downlink splitter comprising a splitter downlink input. The splitter downlink input is configured to receive the electrical combined downlink communications signal from the combiner downlink output, split the received electrical combined downlink communications signal into a plurality of electrical split downlink communications signals, and provide the plurality of electrical split downlink communications signals on a plurality of splitter downlink outputs each corresponding to a backplane interconnect among the plurality of backplane interconnects. The backplane also comprises an uplink combiner comprising a plurality of combiner uplink inputs each corresponding to a backplane interconnect among the plurality of backplane interconnects. The plurality of combiner uplink inputs is configured to receive a plurality of electrical uplink communications signals from at least one OIM, combine the received plurality of electrical uplink communications signals into an electrical combined uplink communications signal, and provide the electrical combined uplink communications signal on a combiner uplink output. The backplane also comprises an uplink splitter comprising a splitter uplink input. The splitter uplink input is configured to receive the electrical combined uplink communications signal from the combiner uplink output, split the received electrical combined uplink communications signal into a plurality of electrical split uplink communications signals, and provide the plurality of electrical split uplink communications signals on a plurality of splitter uplink outputs each corresponding to a backplane interconnect among the plurality of backplane interconnects.

The backplane also comprises a plurality of downlink switches each configured to selectively couple, in response to a downlink switch selector, either the backplane downlink input of a backplane interconnect connected to a RIM, to a corresponding combiner downlink input among the plurality of combiner downlink inputs to provide the electrical downlink communications signal from the RIM to the downlink combiner; or the backplane downlink output of the backplane interconnect connected to an OIM, to a corresponding splitter downlink output among the plurality of splitter downlink outputs to provide the electrical split downlink communications signal to the OIM. The backplane also comprises a plurality of uplink switches each configured to selectively couple, in response to an uplink switch selector, either the backplane uplink output of a backplane interconnect connected to the RIM, to a corresponding splitter uplink output among the plurality of splitter uplink outputs to provide the electrical split uplink communications signal to the RIM; or the backplane uplink input of the backplane interconnect connected to the OIM, to a corresponding combiner uplink input among the plurality of combiner uplink inputs to provide the electrical uplink communications signal from the OIM to the uplink combiner.

Another embodiment of the disclosure relates to a method for interconnecting a connected module in a head-end chassis with head-end equipment in an optical fiber-based DAS. The method comprises detecting a connection of a connected module comprised of a RIM or an OIM, to a backplane interconnect of a module slot among a plurality of module slots in a head-end chassis. The method also comprises determining if the connected module in the module slot is a RIM or an OIM. If the connected module in the module slot is determined to be a RIM, the method comprises coupling the backplane interconnect connected to the RIM to a downlink combiner. The downlink combiner is configured to receive an electrical downlink communications signal from the RIM, combine the received electrical downlink communications signal into an electrical combined downlink communications signal and provide the electrical combined downlink communications signal to a downlink splitter. The method also comprises coupling the backplane interconnect connected to the RIM to an uplink splitter. The uplink splitter is configured to receive an electrical combined uplink communications signal from an uplink combiner, split the electrical combined uplink communications signal into the plurality of electrical split uplink communications signals, and provide the electrical split uplink communications signal to the RIM. If the connected module in the module slot is determined to be an OIM, the method comprises coupling the backplane interconnect connected to the OIM to a downlink splitter. The downlink splitter is configured to receive the electrical combined downlink communications signal from the downlink combiner, split the received electrical combined downlink communications signal into an electrical split downlink communications signal, and provide the electrical split downlink communications signal to the OIM. The method also comprises coupling the backplane interconnect connected to the OIM to an uplink combiner. The uplink combiner is configured to receive an electrical uplink communications signal from the OIM, combine the received electrical uplink communications signal into the electrical combiner uplink communications signal, and provide the electrical combined uplink communications signal to the uplink splitter.

Another embodiment of the disclosure relates to an optical fiber-based DAS. The optical fiber-based DAS comprises a central unit. The central unit comprises a plurality of RIMs each configured to receive an electrical downlink communications signal and receive an electrical split uplink communications signal from at least one OIM. The central unit also comprises a plurality of OIMs. Each OIM is configured to receive an electrical split downlink communications signal, convert the received electrical split downlink communications signal into an optical split downlink communications signal, distribute the optical split downlink communications signal to a plurality of remote units, receive a plurality of optical uplink communications signals from the plurality of remote units, and convert the received plurality of optical uplink communications signals to a plurality of electrical uplink communications signals. Each of the plurality of remote units is configured to receive the optical split downlink communications signal from the central unit, convert the received optical split downlink communications signal into an electrical split downlink communications signal, distribute the electrical split downlink communications signal to at least one client device, receive an electrical uplink communications signal from the at least one client device, convert the received electrical uplink communications signal into an optical uplink communications signal, and distribute the optical uplink communications signal to the central unit.

The central unit further comprises a head-end chassis. The head-end chassis comprises a housing. The head-end chassis also comprises a plurality of module slots disposed in the housing. Each module slot among the plurality of module slots configured to receive a connected module comprised of a RIM among the plurality of RIMs or an OIM among the plurality of OIMs. The head-end chassis further comprises a backplane disposed in the housing. The backplane comprises a plurality of backplane interconnects each associated with a module slot among the plurality of module slots. Each backplane interconnect among the plurality of backplane interconnects is configured to interconnect with the connected module inserted into the module slot associated with the backplane interconnect. Each backplane interconnect among the plurality of backplane interconnects comprises a backplane downlink input configured to receive the electrical downlink communications signal from a RIM among the plurality of RIMs, a backplane downlink output configured to provide an electrical split downlink communications signal to an OIM among the plurality of OIMs, a backplane uplink input configured to receive an electrical uplink communications signal from the OIM, and a backplane uplink output configured to provide an electrical split uplink communications signal to the RIM. The head-end chassis also comprises a downlink combiner comprising a plurality of combiner downlink inputs each corresponding to a backplane interconnect among the plurality of backplane interconnects. The plurality of combiner downlink inputs is configured to receive a plurality of electrical downlink communications signals from the plurality of RIMs, combine the received plurality of electrical downlink communications signals into an electrical combined downlink communications signal, and provide the electrical combined downlink communications signal on a combiner downlink output. The head-end chassis also comprises a downlink splitter comprising a splitter downlink input. The splitter downlink input is configured to receive the electrical combined downlink communications signal from the combiner downlink output, split the received electrical combined downlink communications signal into a plurality of electrical split downlink communications signals, and provide the plurality of electrical split downlink communications signals on a plurality of splitter downlink outputs each corresponding to a backplane interconnect among the plurality of backplane interconnects. The head-end chassis also comprises an uplink combiner comprising a plurality of combiner uplink inputs each corresponding to a backplane interconnect among the plurality of backplane interconnects. The plurality of combiner uplink inputs is configured to receive a plurality of electrical uplink communications signals from the plurality of OIMs, combine the received plurality of electrical uplink communications signals into an electrical combined uplink communications signal, and provide the electrical combined uplink communications signal on a combiner uplink output. The head-end chassis also comprises an uplink splitter comprising a splitter uplink input. The splitter uplink input is configured to receive the electrical combined uplink communications signal from the combiner uplink output, split the received electrical combined uplink communications signal into a plurality of electrical split uplink communications signals, and provide the plurality of electrical split uplink communications signals on a plurality of splitter uplink outputs each corresponding to a backplane interconnect among the plurality of backplane interconnects.

The head-end chassis also comprises a plurality of downlink switches each configured to selectively couple, in response to a downlink switch selector, either the backplane downlink input of a backplane interconnect connected to a RIM, to a corresponding combiner downlink input among the plurality of combiner downlink inputs to provide the electrical downlink communications signal from the RIM to the downlink combiner; or the backplane downlink output of the backplane interconnect connected to an OIM, to a corresponding splitter downlink output among the plurality of splitter downlink outputs to provide the electrical split downlink communications signal to the OIM. The head-end chassis also comprises a plurality of uplink switches each configured to selectively couple, in response to an uplink switch selector, either the backplane uplink output of a backplane interconnect connected to the RIM, to a corresponding splitter uplink output among the plurality of splitter uplink outputs to provide the electrical split uplink communications signal to the RIM; or the backplane uplink input of the backplane interconnect connected to the OIM, to a corresponding combiner uplink input among the plurality of combiner uplink inputs to provide the electrical uplink communications signal from the OIM to the uplink combiner.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Various embodiments will be further clarified by the following examples.

Embodiments disclosed herein include flexible head-end chassis supporting automatic identification and interconnection of radio interface modules (RIMs) and optical interface modules (OIMs) in an optical fiber-based distributed antenna system (DAS). Related methods and DASs are also disclosed. The flexible head-end chassis is provided as part of head-end equipment in an optical fiber-based DAS. In one embodiment, the flexible head-end chassis includes a plurality of module slots (e.g., circuit board card slots). Each of the module slots is configured to receive either a RIM or an OIM. The flexible head-end chassis includes a backplane configured to be interconnected with a RIM or OIM fully inserted into a module slot of the flexible head-end chassis. When a RIM or OIM is inserted into a module slot of the flexible head-end chassis and interconnected with the backplane, a chassis control system identifies the inserted RIM or OIM to determine which type of module is inserted in the module slot. Based on the identification of the inserted RIM or OIM, the chassis control system interconnects the inserted RIM or OIM to related signal routing circuitry (e.g., combiners and splitters) in the head-end equipment needed for the RIM or OIM to be capable of receiving downlink communications signals and uplink communications signals for processing and distribution in the optical fiber-based DAS. In this manner, the optical fiber-based DAS can easily be configured or reconfigured with different numbers and combinations of RIMs and OIMs, as needed or desired, for the optical fiber-based DAS to support the desired communications services and/or number of remote units.

Figure 1:
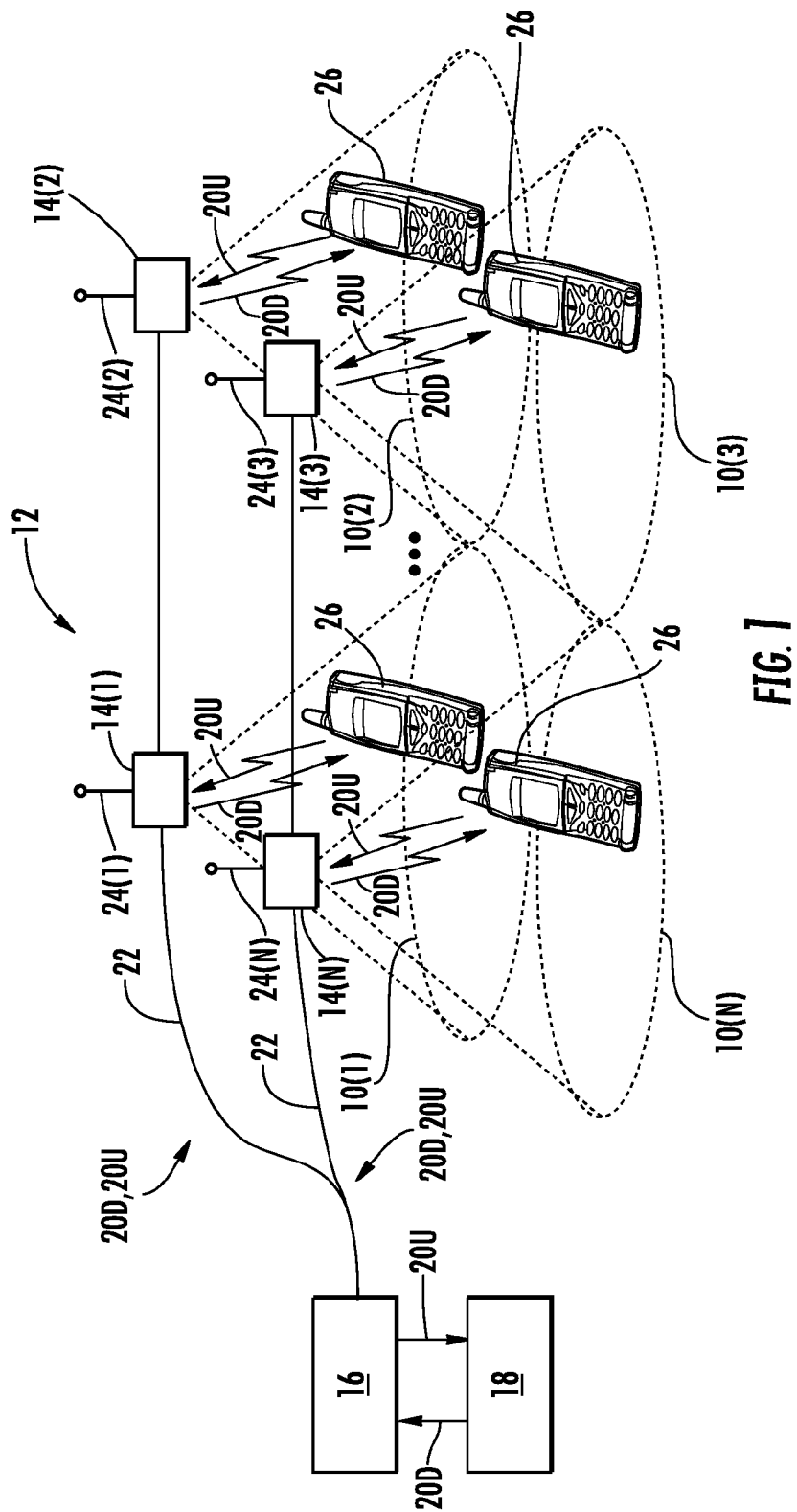
FIG. 1 is a schematic diagram of an exemplary distributed antenna system (DAS) capable of distributing radio-frequency (RF) communications services to client devices.
Figure 2:
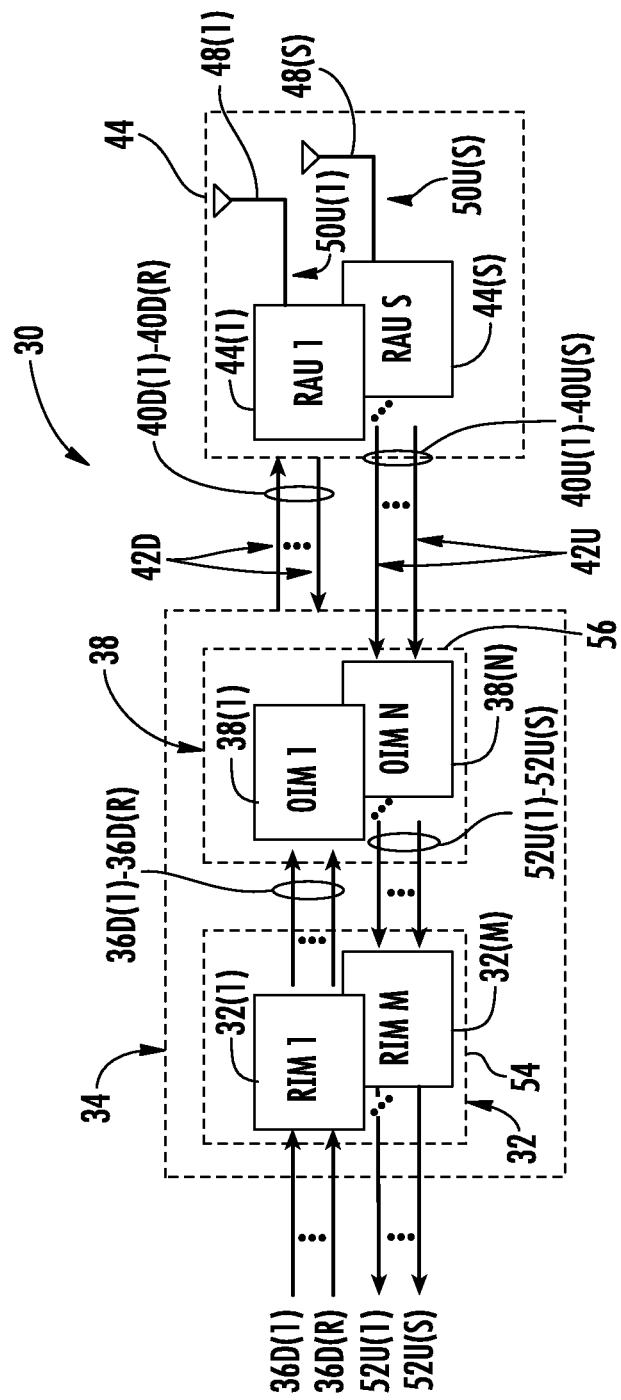
FIG. 2 is a schematic diagram of an exemplary optical fiber-based DAS including head-end equipment that includes remote interface modules configured to receive and process electrical communications signals in supported frequency bands and optical interface modules providing an optical interface for the electrical communications signals.
Figure 3:
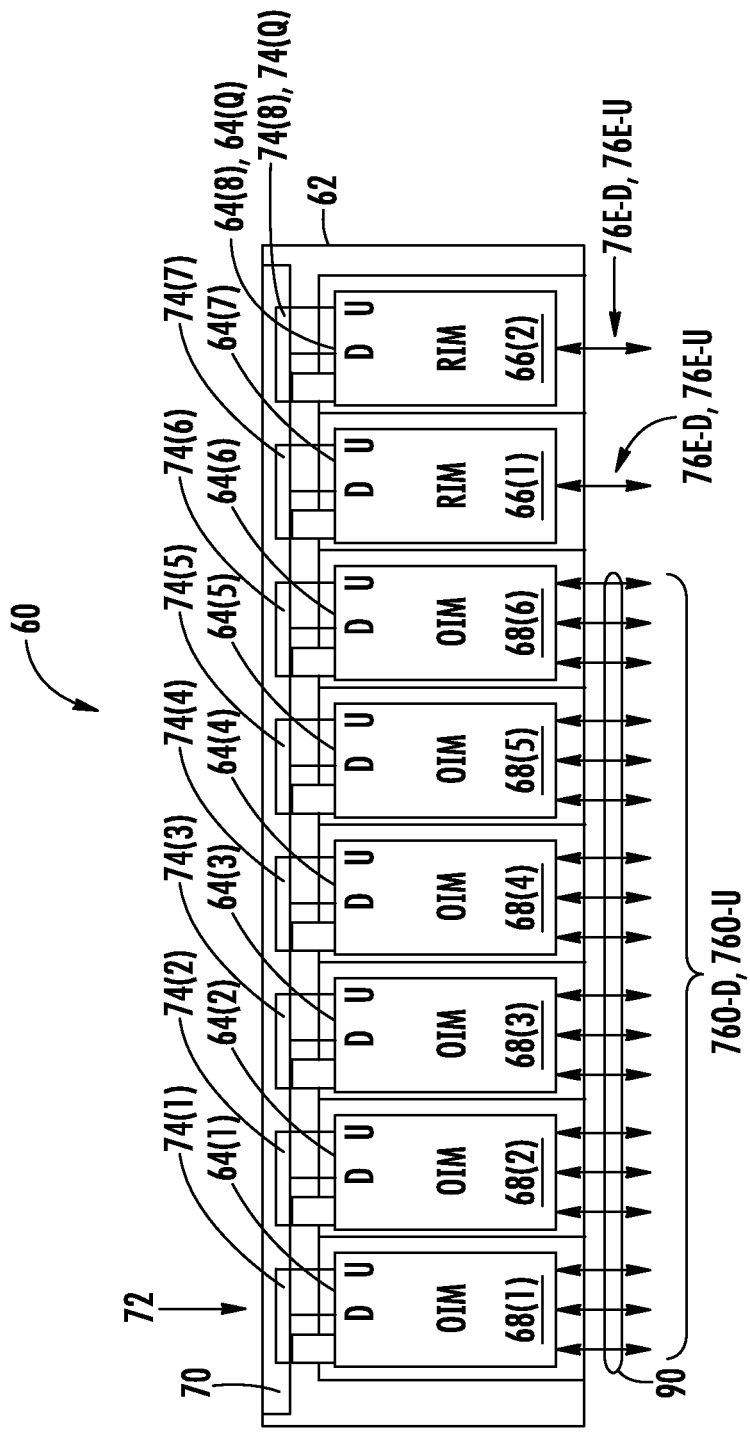
FIG. 3 is a schematic diagram of a flexible head-end chassis in an optical fiber-based DAS, wherein the flexible head-end chassis includes a plurality of module slots each configured to flexibly receive either a radio interface module (RIM) or an optical interface module (OIM), and provide automatic interconnection of the received RIM or OIM in the optical fiber-based DAS.

In this regard, FIG. 3 is a top view of an exemplary flexible head-end chassis 60 that can be provided in an optical fiber-based DAS. As will be discussed in more detail below, the flexible head-end chassis 60 is configured to be provided as part of head-end equipment in an optical fiber-based DAS in FIG. 4 to support both RIMs and OIMs. As shown in FIG. 3, the flexible head-end chassis 60 includes a housing 62 that includes a plurality of module slots 64(1)-64(Q) each configured to receive a RIM 66 or an OIM 68. The notation "1-Q" indicates that any number of the referenced component, 1-Q, may be provided. In this example, the housing 62 of the flexible head-end chassis 60 has eight (8) module slots 64(1)-64(8) to support any combination of eight RIMs 66 and OIMs 68. A backplane 70 is provided in the rear section 72 of the housing 62. The backplane 70 includes a backplane interconnect 74(1)-74(8),74(Q) for each module slot 64(1)-64(8),64(Q) to support an interconnection with a RIM 66 or OIM 68 fully inserted into a module slot 64(1)-64(Q). In this example, two RIMs 66(1), 66(2) are inserted into module slots 64(7) and 64(8) and interconnected with a backplane interconnects 74(7), 74(8). The RIMs 66(1), 66(2) are configured to receive electrical downlink communications signals 76E-D from outside of a DAS, such as from a base station (not shown). The RIMs 66(1), 66(2) process and distribute the received electrical downlink communications signal 76E-D through the respective backplane interconnects 74(7), 74(8) to the OIMs 68(1)-68(6). The OIMs 68(1)-68(6) provided in the module slots 64(1)-64(6) are interconnected to respective backplane interconnects 74(1)-74(6). The OIMs 68(1)-68(6) are configured to receive electrical downlink communications signals 76E-D from the RIMs 66(1), 66(2) through the backplane 70 and convert the received electrical downlink communications signals 76E-D into optical downlink communications signals 76O-D. The OIMs 68(1)-68(6) are configured to distribute the optical downlink communications signals 76O-D over an optical fiber communications medium 90 to remote units (not shown). The six (6) OIMs 68(1)-68(6) are also configured to receive optical uplink communications signals 76O-U from the remote units, convert the received optical uplink communications signals 76O-U into electrical uplink communications signals 76E-U, and distribute the electrical uplink communications signals 76E-U through the backplane interconnects 74(1)-74(6) to the RIMs 66(1), 66(2).

As will be discussed in more detail below, when a RIM 66 or OIM 68 is inserted into a particular module slot 64 of the flexible head-end chassis 60 in FIG. 3, a chassis control system described below detects which type of module is inserted in the module slot 64. Based on the identification of the inserted RIM 66 or OIM 68 in the module slot 64, the chassis control system configures the backplane interconnect 74 corresponding to the module slot 64 to interconnect the inserted RIM 66 or OIM 68 to related combiners and splitters in the head-end equipment needed for the RIM 66 or OIM 68 to be capable of receiving downlink communications signals 76D and uplink communications signals 76U for processing and distribution in an optical fiber-based DAS. In this manner, an optical fiber-based DAS employing the flexible head-end chassis 60 can easily be configured or reconfigured with different numbers and combinations of RIMs 66 and OIMs 68, as needed or desired, for the optical fiber-based DAS to support the desired communications services and/or number of remote units.

Figure 4:
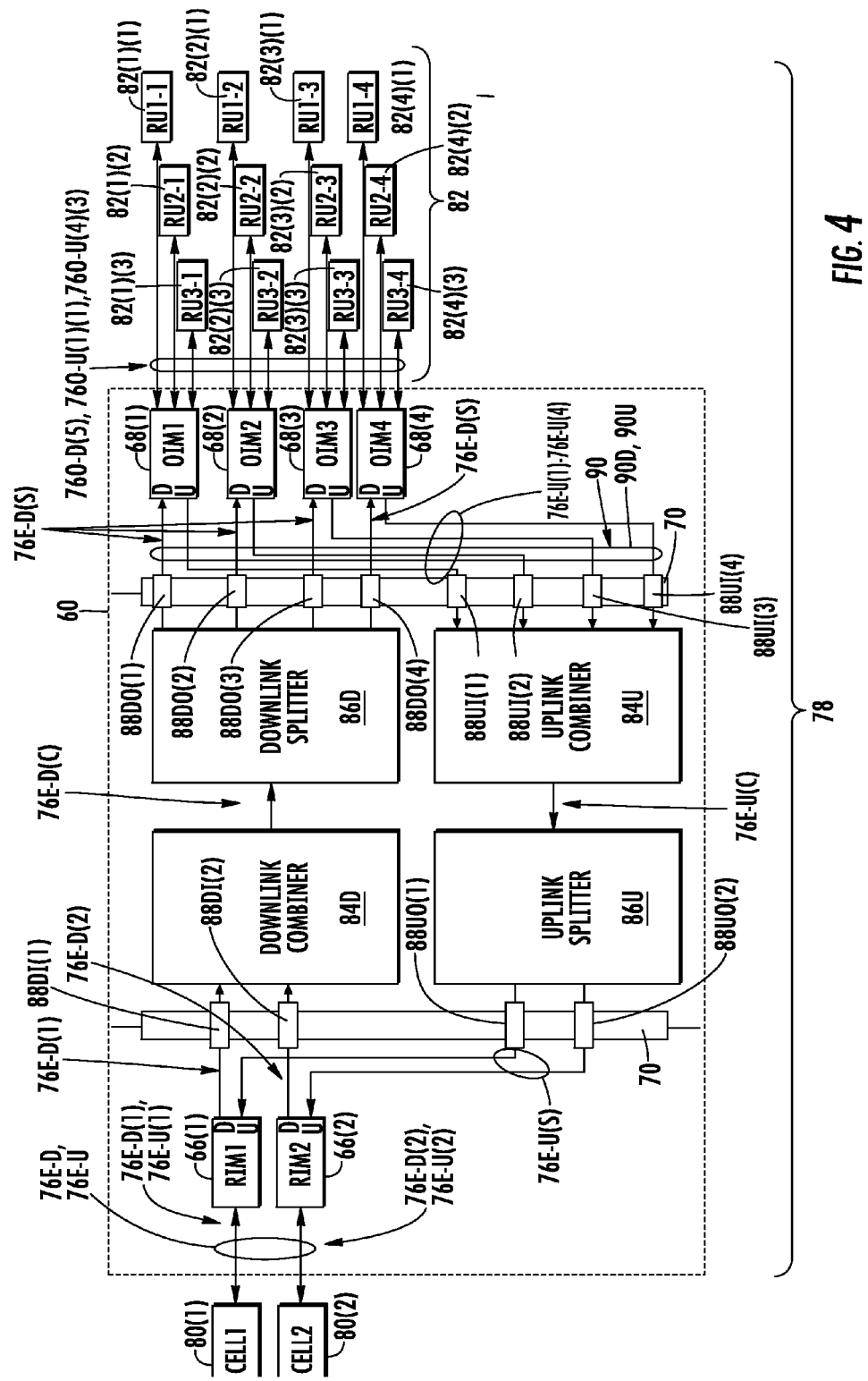
FIG. 4 is a schematic diagram of an exemplary optical fiber-based DAS employing the flexible head-end chassis in FIG. 3 and illustrating exemplary interconnectivity of RIMs and OIMs through a backplane of the flexible head-end chassis.
Figure 5:
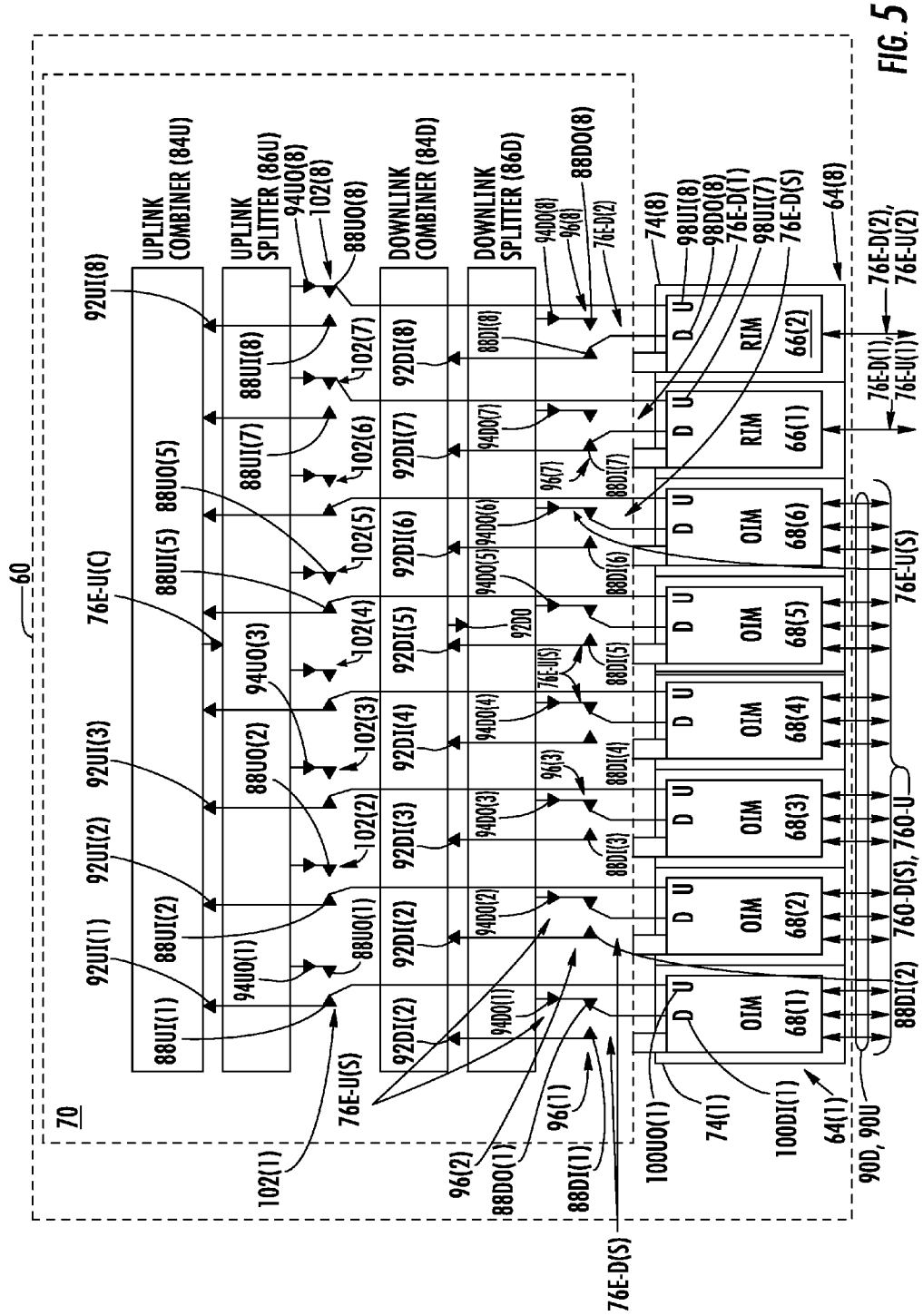
FIG. 5 is a schematic diagram illustrating exemplary detail of a flexible head-end chassis configured to be provided in an optical fiber-based DAS, wherein the flexible head-end chassis includes a plurality of module slots each configured to flexibly receive either a RIM or an OIM, and provide automatic interconnection of the received RIM or OIM according to the exemplary interconnectivity of RIMs and OIMs in head-end equipment of the optical fiber-based DAS illustrated in FIG. 4.
Figure 6:
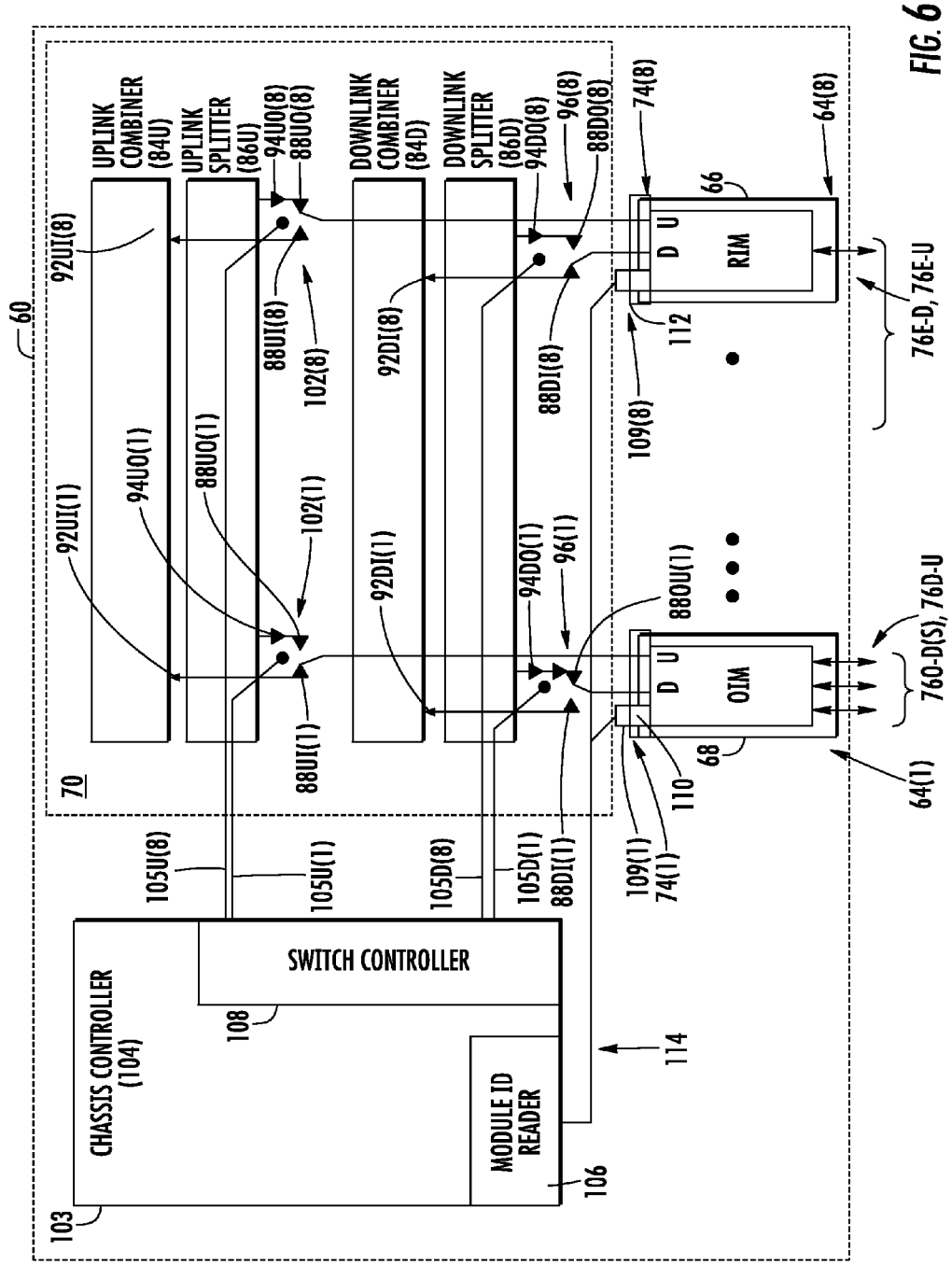
FIG. 6 is a schematic diagram illustrating additional exemplary detail of a chassis controller that can be provided in the flexible head-end chassis in FIG. 5 to provide automatic identification and interconnection of received RIMs and OIMs in an optical-fiber based DAS according to the exemplary interconnectivity of RIMs and OIMs in head-end equipment in FIG. 4.
Figure 7:
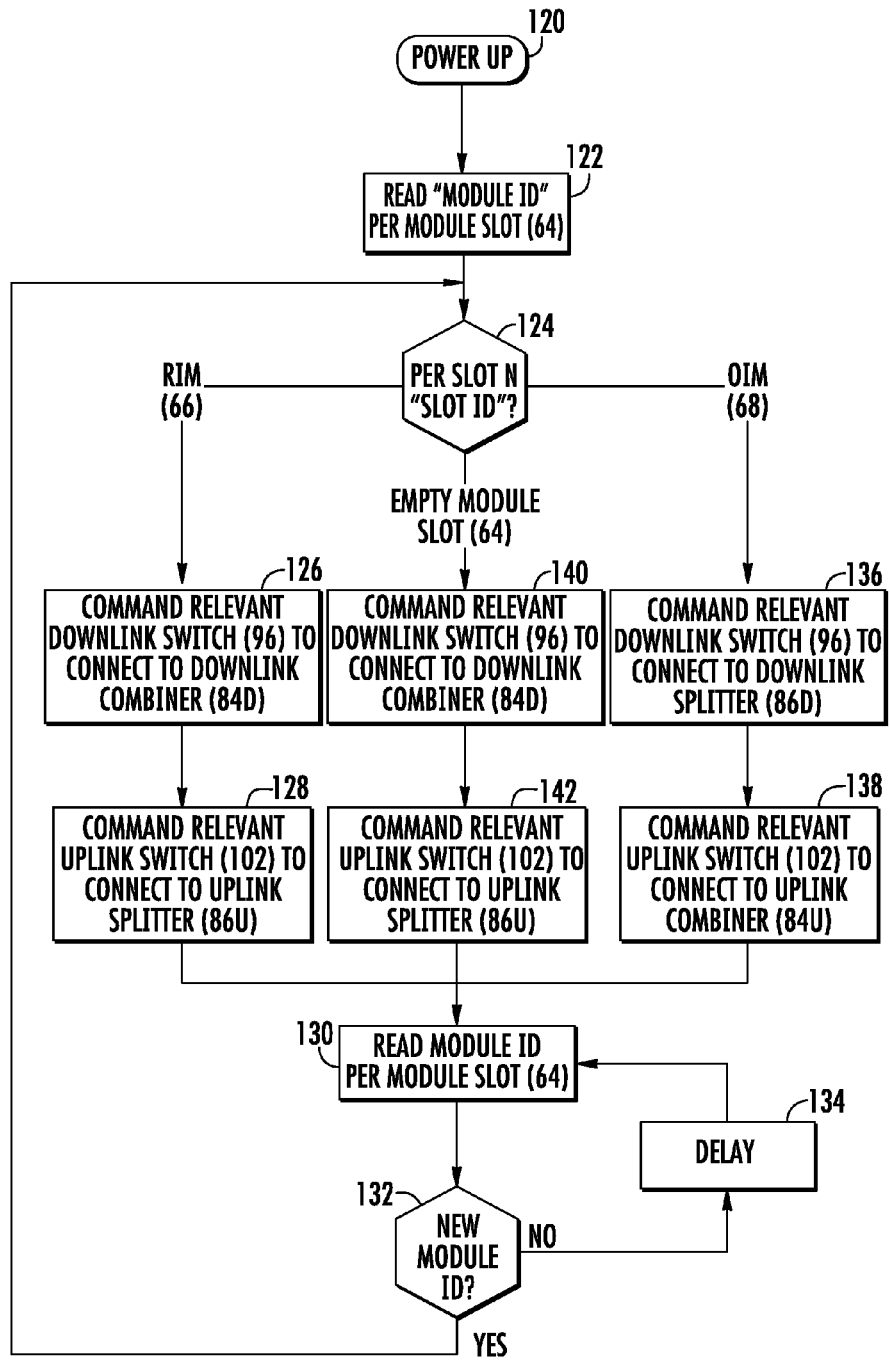
FIG. 7 is a flowchart illustrating an exemplary process of the chassis controller in FIG. 6 automatically identifying and interconnecting a received RIM or OIM in an optical fiber-based DAS according to the exemplary interconnectivity of RIMs and OIMs in head-end equipment in FIG. 4.

In this regard, FIG. 4 is a schematic diagram of an optical fiber-based DAS 78 employing the flexible head-end chassis 60 in FIG. 3. The flexible head-end chassis 60 can be provided in a central unit of the optical fiber-based DAS 78. FIG. 4 illustrates exemplary interconnectivity of the RIMs 66(1), 66(2) and OIMs 68(1)-68(4) to be provided through the backplane interconnects 74(1)-74(8) (shown in FIG. 3) of the backplane 70 of the flexible head-end chassis 60 to provide the optical fiber-based DAS 78. Note that only four OIMs 68(1)-68(4) are illustrated as being installed in the flexible head-end chassis 60 in FIG. 4 for illustrative purposes. FIGS. 5-7 will be described below to discuss examples of how the flexible head-end chassis 60 can be configured to automatically identify RIMs 66 and OIMs 68 inserted in the flexible head-end chassis 60 and automatically configure the backplane interconnects 74 to accomplish the exemplary interconnectivity illustrated in FIG. 4.

First, with reference to the RIMs 66(1), 66(2) in FIG. 4, the RIMs 66(1), 66(2) inserted in the flexible head-end chassis 60 are shown as interfacing with respective cells 80(1), 80(2) outside of the optical fiber-based DAS 78. For example, cell 80(1) may provide a first electrical downlink communications signal 76E-D(1) to RIM 66(1), and cell 80(2) may provide a second electrical downlink communications signal 76E-D(2) to RIM 66(2). RIM 66(1) may be configured to support a first frequency band supported by cell 80(1), and RIM 66(2) may be configured to support a second frequency band, which may be different than the first frequency band, supported by cell 80(2). The RIMs 66(1), 66(2) are configured to distribute the electrical downlink communications signals 76E-D(1), 76E-D(2) through the optical fiber-based DAS 78 to remote units 82 as the optical downlink communications signals 76O-D. As will be discussed below, the RIMs 66(1), 66(2) also receive electrical uplink communications signals 70E-U(1), 70E-U(2) as a result of the remote units 82 receiving electrical uplink communications signals 76E-U from client devices (not shown), to be distributed to the cells 80(1), 80(2).

With continuing reference to FIG. 4, for the RIMs 66(1), 66(2) inserted in the flexible head-end chassis 60, it is desired in the optical fiber-based DAS 78 to combine the multiple electrical downlink communications signals 76E-D(1), 76E-D(2) in a downlink combiner 84D into an electrical combined downlink communications signal 76E-D(C), which is then split in a downlink splitter 86D into multiple electrical split downlink communications signals 76E-D(S) each to be distributed to the OIMs 68(1)-68(4). To facilitate this interconnectivity in the flexible head-end chassis 60, the backplane interconnects 74(7), 74(8) (shown in FIG. 3) connected to the RIMs 66(1), 66(2) each include a backplane downlink input 88DI(1), 88DI(2) configured to receive the electrical downlink communications signals 76E-D(1), 76E-D(2) from the RIMs 66(1), 66(2). The RIMs 66(1), 66(2) are interconnected to the backplane downlink inputs 88DI(1), 88DI(2) as a result of the RIMs 66(1), 66(2) being interconnected to the backplane 70 when installed in the flexible head-end chassis 60. Note that in this example, all multiple electrical downlink communications signals 76E-D(1), 76E-D(2) are combined into a single electrical combined downlink communications signal 76E-D(C). However, note that the downlink combiner 84D could also be configured to selectively combine electrical downlink communications signals 76E-D(1), 76E-D(2), such as if it is desired to configured the optical fiber-based DAS 78 to different combinations/sectors of electrical downlink communications signals 76E-D to remote units 82.

With continuing reference to FIG. 4, the OIMs 68(1)-68(4) inserted in the flexible head-end chassis 60 are shown as interfacing with the remote units 82. In this example, each OIM 68(1)-68(4) interfaces with up to three remote units 82 over optical fiber communications medium 90. In this example, a separate downlink optical fiber communications medium 90D for distribution of optical downlink communications signals 76-D and a separate uplink optical fiber communications medium 90U for distribution of optical uplink communications signals 76-O is provided, but such is not required. For example, a common optical fiber communication medium could be employed using wave-division multiplexing (WDM). Thus, for example, OIM 68(1) interfaces with three (3) remote units 82(1)(1)-82(1)(3). OIM 68(4) interfaces with three (3) remote units 82(4)(1)-82(4)(3). The OIMs 68(1)-68(4) receive and convert the received electrical split downlink communications signals 76E-D(S), received over respective backplane downlink outputs 88DO(1)-88DO(4) provided in the backplane interconnects 74(1)-74(4) (FIG. 3), as a result of the interconnection of the OIMs 68(1)-68(4) to the backplane 70, to respective optical split downlink communications signals 76O-D(S). The optical split downlink communications signals 76O-D(S) are distributed over the downlink optical fiber communication medium 80D to remote units 82(1)(1)-82(4)(3) in this example. Note that the flexible head-end chassis 60 could alternatively be configured to selectively deliver the optical split downlink communications signals 76O-D(S) to different remote units 82(1)(1)-82(4)(3).

With continuing reference to FIG. 4, the remote units 82(1)(1)-82(4)(3) are each configured to receive electrical uplink communications signals, which are then converted to corresponding optical uplink communications signals 76O-U(1)(1)-76O-U(4)(3) and distributed to respective OIMs 68(1)-68(4) inserted in the flexible head-end chassis 60 over the uplink optical fiber communications medium 90U. The OIMs 68(1)-68(4) convert the received optical uplink communications signals 76O-U(1)(1)-76O-U(4)(3) into corresponding electrical uplink communications signals 76E-U(1)-76E-U(4), which are provided in backplane uplink inputs 88UI(1)-88UI(4) in the backplane interconnects 74(1)-74(4) (FIG. 3) connected to the OIMs 68(1)-68(4) as a result of the interconnection of the OIMs 68(1)-68(4) to the backplane 70. It is also desired in this exemplary optical fiber-based DAS 78 to combine the multiple electrical uplink communications signals 76E-U(1)-76E-U(4) in an uplink combiner 84U into an electrical combined uplink communications signal 76E-U(C), which is then split in an uplink splitter 86U into multiple electrical split uplink communications signals 76E-U(S). Each of the electrical split uplink communications signals 76E-U(S) are distributed over backplane uplink outputs 88UO(1)-88UO(2) as part of the backplane interconnects 74(7), 74(8) (FIG. 3) to the RIMs 66(1), 66(2) as a result of the interconnection of the RIMs 66(1), 66(2) to the backplane 70. The RIMs 66(1), 66(2) are each configured to filter the received electrical split uplink communications signals 76E-U(S) in their supported frequency band into respective electrical uplink communications signals 76E-U(1), 76E-U(2) to be distributed to their respective cells 80(1), 80(2).

Thus in summary, as illustrated in FIG. 4 and described above, each backplane interconnect 74(1)-74(8) (FIG. 3) in the backplane 70 corresponding to a module slot 64(1)-64(8) (FIG. 3) in the flexible head-end chassis 60 contains a backplane downlink input 88DI, a backplane downlink output 88DO, a backplane uplink input 88UI, and a backplane uplink output 88UO to allow for either a RIM 66 or OIM 68 to be flexibly installed in any module slot 64 (FIG. 3). If a RIM 66 is installed in a given module slot 64, backplane downlink input 88DI and backplane uplink output 88UO of the corresponding backplane interconnect 74 are configured to be connected to the installed RIM 66. This is so that the downlink combiner 84D receives electrical downlink communications signals 76E-D from the installed RIM 66, and so that the installed RIM 66 receives the electrical split uplink communications signal 76E-U(S) from the uplink splitter 86U. However, if an OIM 68 is installed in a given module slot 64 instead of a RIM 66, the backplane downlink output 88DO and the backplane uplink input 88UI of the corresponding backplane interconnect 74 are configured to be connected to the installed OIM 68. This is so that the uplink combiner 84U receives the electrical uplink communications signal 76E-U from the installed OIM 68, and so that the installed OIM 68 receives the electrical split downlink communications signal 76E-D(S) from the downlink splitter 86D. In this manner, a RIM 66 or OIM 68 may be installed in any module slot 64 in the flexible head-end chassis 60 and the desired interconnectivity with the backplane 70 and its distribution components to provide the optical fiber-based DAS 78 can be achieved in either case.

FIG. 5 is a schematic diagram illustrating exemplary detail of the flexible head-end chassis 60 to illustrate components that can be provided in the backplane 70 to allow backplane interconnects 74(1)-74(8) to automatically be configured to provide the interconnectivity for either a RIM 66 or an OIM 68, based on whether a RIM 66 or OIM 68 is inserted into a corresponding module slot 64(1)-64(8). Later below with regard to FIGS. 6 and 7, an exemplary chassis control system that can be provided in the backplane 70 is described to identify an installed RIM 66 or OIM 68 in a module slot 64 of the flexible head-end chassis 60. The chassis control system is configured to automatically configure the interconnectivity of a backplane downlink input 88DI, a backplane downlink output 88DO, an backplane uplink input 88UI, and a backplane uplink output 88UO for a given backplane interconnect 74, with regard to the downlink combiner 84D, downlink splitter 86D, uplink combiner 84U, and uplink splitter 86U, to allow for either a RIM 66 or OIM 68 to be flexibly installed in a given, corresponding module slot 64 according to the exemplary interconnectivity provided in FIG. 4.

With reference to FIG. 5, the downlink combiner 84D in the backplane 70 includes combiner downlink inputs 92DI(1)-92D1(8) for each backplane interconnect 74(1)-74(8). The combiner downlink inputs 92DI(1)-92D1(8) are each configured to receive an electrical downlink communications signals 76E-D from a RIM 66 if a RIM 66 is installed in the module slot 64 corresponding to the backplane interconnect 74(1)-74(8). The downlink combiner 84D is configured to combine received plurality of electrical downlink communications signals 76E-D from RIMs 66 installed in any module slots 64(1)-64(8) into the electrical combined downlink communications signal 76E-D(C), and provide the electrical combined downlink communications signal 76E-D(C) on a combiner downlink output 92DO to be provided to the downlink splitter 86D. The downlink splitter 86D in the backplane 70 includes splitter downlink outputs 94DO(1)-94DO(8) for each backplane interconnect 74(1)-74(8). The splitter downlink outputs 94DO(1)-94DO(8) are each configured to provide the electrical split downlink communications signal 76E-D(S) from the combiner downlink output 92DO of the downlink combiner 84D to an OIM 68 if an OIM 68 is installed in the module slot 64 corresponding to the backplane interconnect 74(1)-74(8).

To provide the proper downlink connectivity between the module, whether it is a RIM 66 or OIM 68, inserted in a given module slot 64, a plurality of downlink switches 96(1)-96(8) are provided in the backplane 70 for each backplane interconnect 74(1)-74(8). Each downlink switch 96(1)-96(8) is configured to selectively couple either a respective backplane downlink input 88DI(1)-88D1(8) or a respective backplane downlink output 88DO(1)-88DO(8) to the installed module. If the installed module is a RIM 66, the downlink switch 96 is configured to couple a respective backplane downlink input 88DI to a RIM downlink output 98DO for the downlink combiner 84D to receive the electrical downlink communications signal 76E-D from the RIM 66. However, if the installed module is an OIM 68, the downlink switch 96 is configured to couple a respective backplane downlink output 88DO to an OIM downlink input 100DI to receive the electrical split downlink communications signal 76E-D(S) from the downlink splitter 86D.

To provide the proper uplink connectivity between the module, whether it is a RIM 66 or OIM 68, inserted in a given module slot 64, a plurality of uplink switches 102(1)-102(8) are provided in the backplane 70 for each backplane interconnect 74(1)-74(8). Each uplink switch 102(1)-102(8) is configured to selectively couple either a respective backplane uplink output 88UO(1)-88UO(8) or a respective backplane uplink input 88UI(1)-88U1(8) to the installed module. If the installed module is a RIM 66, the uplink switch 102 is configured to couple a respective backplane uplink output 88UO to a RIM uplink input 98UI, to couple the RIM uplink input 98UI to a splitter uplink output 94UO of the uplink splitter 86U for the uplink splitter 86U, to provide the electrical split uplink communications signal 76E-U(S) from the uplink splitter 86U to the RIM 66. However, if the installed module is an OIM 68, the uplink switch 102 is configured to couple a respective backplane uplink input 88UI to an OIM uplink output 100UO, to couple the OIM uplink output 100UO to a combiner uplink input 92UI of the uplink combiner 84U, for the OIM 68 to provide an electrical uplink communications signal 76E-U to the uplink combiner 84U.

FIG. 6 is a schematic diagram illustrating additional exemplary detail of a chassis control system 103 that can be provided in the flexible head-end chassis 60 in FIG. 5 to provide automatic identification and interconnection of installed RIMs 66 and OIMs 68 in the optical fiber-based DAS 78 according to the exemplary interconnectivity of RIMs 66 and OIMs 68 in head-end equipment in FIG. 4. More specifically, as discussed in more detail below, the chassis control system 103 include a chassis controller 104 that is configured to cause the downlink switches 96(1)-96(8) and the uplink switches 102(1)-102(8) to be set to provide the correct interconnectivity between the installed module and the respective backplane interconnects 74(1)-74(8) based on whether a RIM 66 or OIM 68 is identified as the module inserted into a respective module slot 64(1)-64(8). Only module slots 64(1) and 64(8) are shown in FIG. 6 to simply the illustration and discussion of the exemplary chassis controller 104, but note that such is applicable for the other module slots 64(2)-64(7) as well.

With reference to FIG. 6, the chassis controller 104 is an electronic controller in this example that includes a module ID reader 106 and a switch controller 108. The module ID reader 106 is configured to identify the type of module inserted into each of the module slots 64(1)-64(8). For example, when the OIM 68 was installed in module slot 64(1), as shown in FIG. 6, the module ID reader 106 receives a signal on a module ID input 109(1) provided as part of the backplane interconnect 74(1) that interconnected with a module ID pin 110 on the OIM 68 when installed. The module ID reader 106 is able to determine that the OIM 68 is installed in module slot 64(1) based on the module ID signal 114 generated by the OIM 68 on module ID pin 110 coupled to the module ID input 109(1). The module ID reader 106 provides an indication of the detected OIM 68 in module slot 64(1) to the chassis controller 104. Similarly, when the RIM 66 was installed in module slot 64(8), as shown in FIG. 6, the module ID reader 106 receives a module ID signal 114 on a module ID input 109(8) provided as part of the backplane interconnect 74(8) that interconnected with a module ID pin 112 on the RIM 66 when installed. The module ID reader 106 is able to determine that the RIM 66 is installed in module slot 64(8) based on the module ID signal 114 generated by the RIM 66 on module ID pin 112 coupled to the module ID input 109(8). The module ID reader 106 provides an indication of the detected RIM 66 in module slot 64(8) to the chassis controller 104. As non-limiting examples, the activation of the module ID reader 106 to detect the module ID signal 114 may be poll driven or interrupt driven.

With continuing reference to FIG. 6, when the chassis controller 104 receives an indication of an installed module in a module slot 64 from the module ID reader 106 and the type of module installed in the module slot 64, the chassis controller 104 is configured to set the downlink and uplink switches 96, 102. The chassis controller 104 is configured to set the downlink and uplink switches 96, 102 corresponding to the module slot 64 with the newly installed module to provide the interconnectivity for the installed module based on whether the installed module is a RIM 66 or OIM 68. In this regard, in this example, the chassis control system 103 includes the switch controller 108. The switch controller 108 is configured to provide respective downlink switch selectors 105D(1)-105D(8) to each of the plurality of downlink switches 96(1)-96(8), and uplink switch selectors 105U(1)-105U(8) to each of the plurality of uplink switches 102(1)-102(8). As discussed above, if an installed module in a module slot 64 is a RIM 66, the chassis controller 104 is configured to cause the switch controller 108 to generate the downlink switch selector 105D corresponding to the module slot 64 to cause the downlink switch 96 corresponding to the module slot 64 with the installed RIM 66 to couple the backplane downlink input 88DI of the corresponding backplane interconnect 74 (FIG. 5) to the corresponding combiner downlink input 92DI. The chassis controller 104 is also configured to cause the switch controller 108 to generate the uplink switch selector 105U to cause the uplink switch 102 corresponding to the module slot 64 with the installed RIM 66 to couple the backplane uplink output 88UO of the corresponding backplane interconnect 74 (FIG. 5) with the installed RIM 66 to the corresponding splitter uplink output 94UO.

With continuing reference to FIG. 6, if an installed module in a module slot 64 is an OIM 68 instead of a RIM 66, the chassis controller 104 is configured to cause the switch controller 108 to generate the downlink switch selector 105D to cause the downlink switch 96 corresponding to the module slot 64 with the installed OIM 68 to couple the backplane downlink output 88DO of the corresponding backplane interconnect 74 (FIG. 5) to the corresponding splitter downlink output 94DO. The chassis controller 104 is also configured to cause the switch controller 108 to generate the uplink switch selector 105U to cause the uplink switch 102 corresponding to the module slot 64 with the installed OIM 68 to couple the backplane uplink input 88UI of the corresponding backplane interconnect 74 (FIG. 5) with the installed OIM 68 to the corresponding combiner uplink input 92UI.

FIG. 7 is a flowchart illustrating an exemplary process of the chassis controller 104 in FIG. 6 automatically identifying and interconnecting a received RIM 66 or OIM 68 in the flexible head-end chassis 60 in the optical fiber-based DAS 78 according to the exemplary interconnectivity in FIG. 4. In this regard, as illustrated in FIG. 7, after the flexible head-end chassis 60 is powered up (block 120), the chassis controller 104 reads the module ID for each module slot 64 in the flexible head-end chassis 60 (block 122). For each module slot 64, the chassis controller 104 determines if the module slot 64 has a RIM 66 installed, an OIM 68 installed, or no module installed (block 124). If the current module slot 64 is determined to have an installed RIM 66, as discussed above, the chassis controller 104 is configured to cause the switch controller 108 to generate the downlink switch selector 105D corresponding to the module slot 64 to cause the downlink switch 96 corresponding to the module slot 64 with the installed RIM 66 to couple the backplane downlink input 88DI of the corresponding backplane interconnect 74 to the corresponding combiner downlink input 92DI of the downlink combiner 84D (block 126). The chassis controller 104 is also configured to cause the switch controller 108 to generate the uplink switch selector 105U to cause the uplink switch 102 corresponding to the module slot 64 with the installed RIM 66 to couple the backplane uplink output 88UO of the corresponding backplane interconnect 74 with the installed RIM 66 to the corresponding splitter uplink output 94UO of the uplink splitter 86U (block 128).

With continuing reference to FIG. 7, the process continues by the chassis controller 104 reading the module slots 64 (block 130) to determine if a new module has been installed in the module slot 64 (block 132). If no new module has been installed in the module slot 64, the chassis controller 104 incurs a delay (block 134) before again determining if any new modules have been installed in any of the module slots 64 (block 130).

With continuing reference to FIG. 7, if current module slot 64 is determined to have an installed OIM 68 in block 124, as discussed above, the chassis controller 104 is configured to cause the switch controller 108 to generate the downlink switch selector 105D to cause the downlink switch 96 corresponding to the module slot 64 with the installed OIM 68 to couple the backplane downlink output 88DO of the corresponding backplane interconnect 74 to the corresponding splitter downlink output 94DO of the downlink splitter 86D (block 136). The chassis controller 104 is also configured to cause the switch controller 108 to generate the uplink switch selector 105U to cause the uplink switch 102 corresponding to the module slot 64 with the installed OIM 68 to couple the backplane uplink input 88UI of the corresponding backplane interconnect 74 with the installed OIM 68 to the corresponding combiner uplink input 92UI of the uplink combiner 84U (block 138). The process in blocks 130, 132, and 134 described above is carried out by the chassis controller 104 thereafter.

With continuing reference to FIG. 7, if current module slot 64 is determined to not have any installed module, in the example process in FIG. 7, the chassis controller 104 is configured to configure the downlink switch 96 and the uplink switch 102 corresponding to the backplane interconnect 74 for the module slot 64 as if a RIM 66 were installed. In this regard, the chassis controller 104 carries out the tasks in blocks 140 and 142, which are the same as tasks in blocks 126 and 128, respectively, in this example. Alternatively, the chassis controller 104 could be configured to treat a module slot 64 without an installed module as if an OIM 68 were installed in the module slot 64. In this alternative scenario, the chassis controller 104 would perform tasks in blocks 136 and 138 described above as if the module slot 64 has an installed OIM 68, in response to detection of no module installed in the module slot 64.

Figure 8:
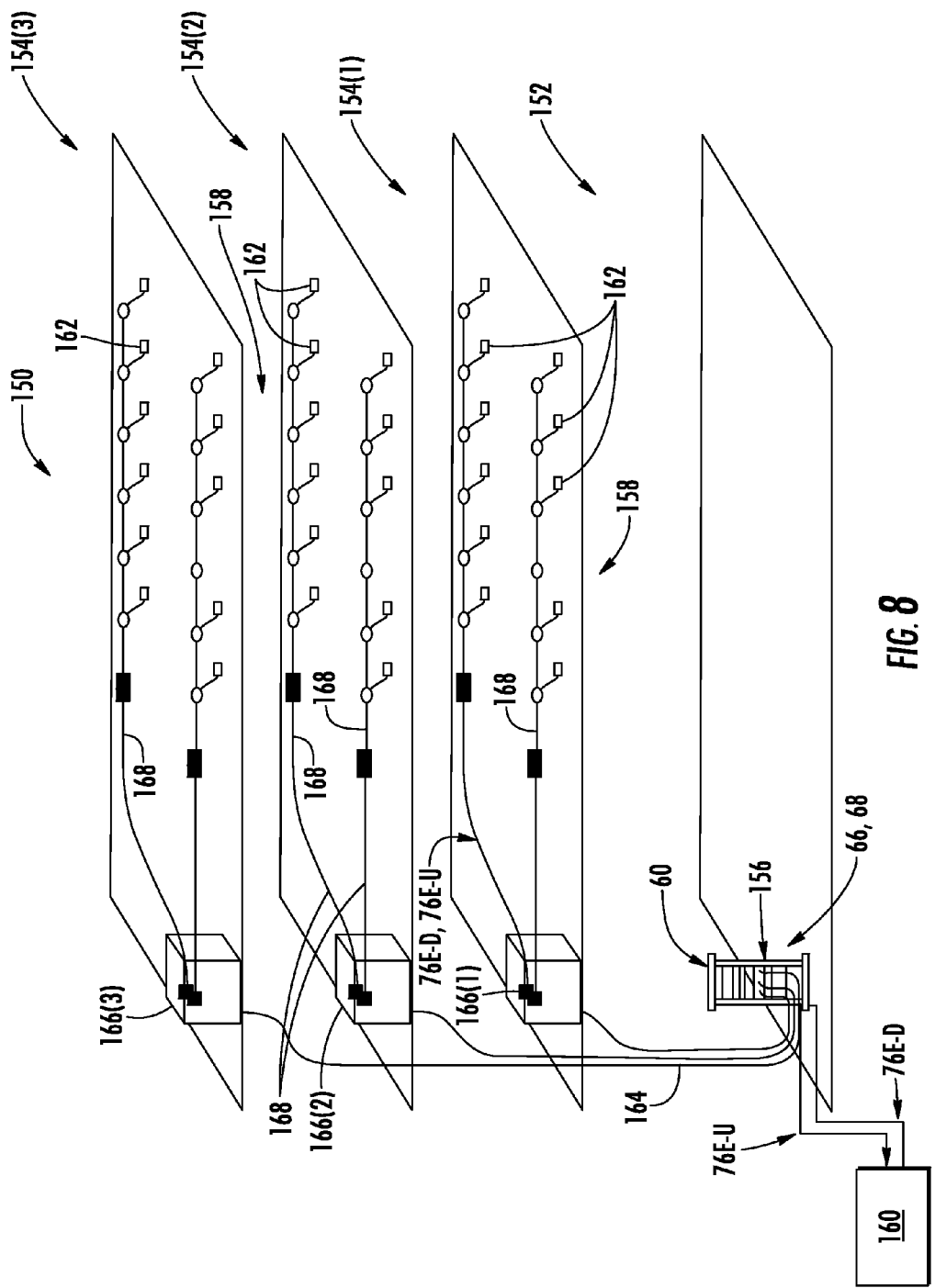
FIG. 8 is a partially schematic cut-away diagram of an exemplary building infrastructure in which an optical fiber-based DAS employing a flexible head-end chassis configured to flexibly receive either a RIM or an OIM, and provide automatic interconnection of the received RIM or OIM in the optical fiber-based DAS can be employed.

The flexible head-end chassis 60 for supporting the RIMs 66 and OIMs 68 provided in an optical fiber-based DAS 78 and automatically identifying and interconnecting a received RIM 66 or OIM 68, may be provided in an optical fiber-based DAS 150 in an indoor environment, as illustrated in FIG. 8. In this regard, FIG. 8 is a partially schematic cut-away diagram of a building infrastructure 152 employing a flexible head-end chassis having feature(s) like those described above. The building infrastructure 152 in this embodiment includes a first (ground) floor 154(1), a second floor 154(2), and a third floor 154(3). The floors 154(1)-154(3) are serviced by the central unit 156 to provide the antenna coverage areas 158 in the building infrastructure 152. The flexible head-end chassis 60 is provided as part of the central unit 156. The central unit 156 is communicatively coupled to the base station 160 to receive electrical downlink communications signals 76E-D from the base station 160. The central unit 156 is communicatively coupled to the remote units 162 to receive the electrical uplink communications signals 76E-U from the remote units 162. The electrical downlink and uplink communications signals 76E-D, 76E-U communicated between the central unit 156 and the remote units 162 are carried over a riser cable 164. The riser cable 164 may be routed through interconnect units (ICUs) 166(1)-166(3) dedicated to each floor 154(1)-154(3) that route the electrical downlink and uplink communications signals 76E-D, 76E-U to the remote units 162 and also provide power to the remote units 162 via array cables 168.

In one embodiment, the central unit 156 is configured to support up to twelve (12) RIMs 66. Each RIM 66 can be designed to support a particular type of radio source or range of radio sources (i.e., frequencies) to provide flexibility in configuring the central unit 156 and the optical fiber-based DAS 150 to support the desired radio sources. For example, one RIM 66 may be configured to support the Personal Communication Services (PCS) radio band. Another RIM 66 may be configured to support the 700 MHz radio band. In this example, by inclusion of these RIMs 66, the central unit 156 could be configured to support and distribute communications signals on both PCS and LTE 700 radio bands, as an example. RIMs 66 may be provided in the central unit 156 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 66 may also be provided in the central unit 156 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 66 may be provided in the central unit 156 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

Figure 9:
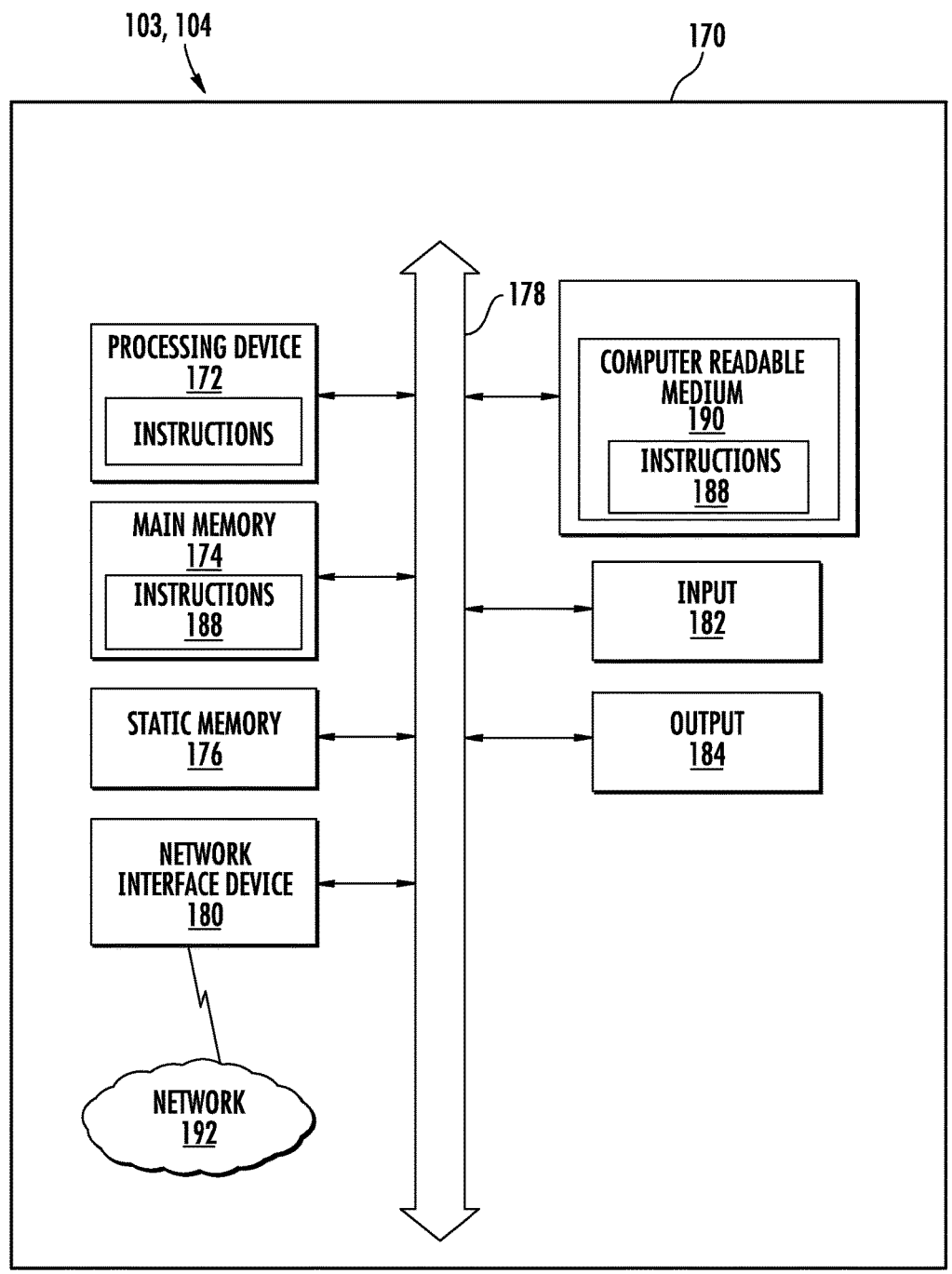
FIG. 9 is a schematic diagram of an exemplary representation of a chassis controller for automatically identifying and interconnecting a received RIM or OIM in a flexible head-end chassis for an optical fiber-based DAS, wherein the exemplary computer system is adapted to execute instructions from an exemplary computer readable medium.

FIG. 9 is a schematic diagram representation of additional detail illustrating a computer system 170 that could be employed in the chassis control system 103 or the chassis controller 104 discussed with regard to FIG. 6 above for automatically identifying and interconnecting a received RIM 66 or OIM 68 in the flexible head-end chassis 60 in an optical fiber-based DAS, including optical fiber-based DAS 78, 150 discussed above. In this regard, the computer system 170 is adapted to execute instructions from an exemplary computer-readable medium to perform these and/or any of the functions or processing described herein.

In this regard, the computer system 170 in FIG. 9 may include a set of instructions that may be executed to automatically identify and interconnect a received RIM 66 or OIM 68 in the flexible head-end chassis 60. The computer system 170 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 170 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 170 in this embodiment includes a processing device or processor 172, a main memory 174 (e.g., read-only memory (ROM), flash memory, dynamic random access memory (DRAM), such as synchronous DRAM (SDRAM), etc.), and a static memory 176 (e.g., flash memory, static random access memory (SRAM), etc.), which may communicate with each other via a data bus 178. Alternatively, the processor 172 may be connected to the main memory 174 and/or static memory 176 directly or via some other connectivity means. The processor 172 may be a controller, and the main memory 174 or static memory 176 may be any type of memory.

The processor 172 represents one or more general-purpose processing devices, such as a microprocessor, central processing unit, or the like. More particularly, the processor 172 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 172 is configured to execute processing logic in instructions for performing the operations and steps discussed herein.

The computer system 170 may further include a network interface device 180. The computer system 170 also may or may not include an input 182, configured to receive input and selections to be communicated to the computer system 170 when executing instructions. The computer system 170 also may or may not include an output 184, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 170 may or may not include a data storage device that includes instructions 188 stored in a computer-readable medium 190. The instructions 188 may also reside, completely or at least partially, within the main memory 174 and/or within the processor 172 during execution thereof by the computer system 170, the main memory 174 and the processor 172 also constituting computer-readable medium. The instructions 188 may further be transmitted or received over a network 192 via the network interface device 180.

While the computer-readable medium 190 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A head-end chassis for an optical fiber-based distributed antenna system (DAS), comprising:
a housing;
a plurality of module slots disposed in the housing, each module slot among the plurality of module slots configured to receive a connected module comprised of a radio interface module (RIM) or an optical interface module (OIM);
a backplane disposed in the housing, the backplane comprising:
a plurality of backplane interconnects each associated with a module slot among the plurality of module slots, each backplane interconnect among the plurality of backplane interconnects configured to interconnect with the connected module inserted into the module slot associated with the backplane interconnect;
each backplane interconnect among the plurality of backplane interconnects comprises:
a backplane downlink input configured to receive an electrical downlink communications signal from a RIM;
a backplane downlink output configured to provide an electrical split downlink communications signal to an OIM;
a backplane uplink input configured to receive an electrical uplink communications signal from an OIM; and
a backplane uplink output configured to provide an electrical split uplink communications signal to a RIM;
a downlink combiner comprising a plurality of combiner downlink inputs each corresponding to a backplane interconnect among the plurality of backplane interconnects, the plurality of combiner downlink inputs configured to receive a plurality of electrical downlink communications signals from a plurality of RIMs, combine the received plurality of electrical downlink communications signals into an electrical combined downlink communications signal, and provide the electrical combined downlink communications signal on a combiner downlink output;
a downlink splitter comprising a splitter downlink input configured to receive the electrical combined downlink communications signal from the combiner downlink output, split the received electrical combined downlink communications signal into a plurality of electrical split downlink communications signals, and provide the plurality of electrical split downlink communications signals on a plurality of splitter downlink outputs each corresponding to a backplane interconnect among the plurality of backplane interconnects;
an uplink combiner comprising a plurality of combiner uplink inputs each corresponding to a backplane interconnect among the plurality of backplane interconnects, the plurality of combiner uplink inputs configured to receive a plurality of electrical uplink communications signals from at least one OIM, combine the received plurality of electrical uplink communications signals into an electrical combined uplink communications signal, and provide the electrical combined uplink communications signal on a combiner uplink output;
an uplink splitter comprising a splitter uplink input configured to receive the electrical combined uplink communications signal from the combiner uplink output, split the received electrical combined uplink communications signal into a plurality of electrical split uplink communications signals, and provide the plurality of electrical split uplink communications signals on a plurality of splitter uplink outputs each corresponding to a backplane interconnect among the plurality of backplane interconnects;
a plurality of downlink switches each configured to selectively couple, in response to a downlink switch selector, either the backplane downlink input of a backplane interconnect connected to a RIM, to a corresponding combiner downlink input among the plurality of combiner downlink inputs to provide the electrical downlink communications signal from the RIM to the downlink combiner; or the backplane downlink output of the backplane interconnect connected to an OIM, to a corresponding splitter downlink output among the plurality of splitter downlink outputs to provide the electrical split downlink communications signal to the OIM; and
a plurality of uplink switches each configured to selectively couple, in response to an uplink switch selector, either the backplane uplink output of a backplane interconnect connected to the RIM, to a corresponding splitter uplink output among the plurality of splitter uplink outputs to provide the electrical split uplink communications signal to the RIM; or the backplane uplink input of the backplane interconnect connected to the OIM, to a corresponding combiner uplink input among the plurality of combiner uplink inputs to provide the electrical uplink communications signal from the OIM to the uplink combiner.

2. The head-end chassis of claim 1, further comprising a chassis control system configured to:
provide the downlink switch selector to each of the plurality of downlink switches; and
provide the uplink switch selector to each of the plurality of uplink switches.

3. The head-end chassis of claim 2, wherein the chassis control system comprises:
a chassis controller; and
a switch controller configured to provide the downlink switch selector to each of the plurality of downlink switches, and provide the uplink switch selector to each of the plurality of uplink switches;
the chassis controller configured to:
detect a connection of the connected module to a backplane interconnect of a module slot in the plurality of module slots;
determine if the connected module is a RIM or an OIM;
if the connected module is a RIM, the chassis controller configured to:
instruct the switch controller to:
generate the downlink switch selector to cause a downlink switch corresponding to the module slot to couple the backplane downlink input of the backplane interconnect connected to the RIM, to the corresponding combiner downlink input; and
generate the uplink switch selector to cause an uplink switch corresponding to the module slot to couple the backplane uplink output of the backplane interconnect connected to the RIM, to the corresponding splitter uplink output;
if the connected module is an OIM, the chassis controller configured to:

instruct the switch controller to:
  generate the downlink switch selector to cause the downlink switch corresponding to the module slot to couple the backplane downlink output of the backplane interconnect connected to the OIM, to the corresponding splitter downlink output; and
  generate the uplink switch selector to cause the uplink switch corresponding to the module slot to couple the backplane uplink input of the backplane interconnect connected to the OIM to the corresponding combiner uplink input.

4. The head-end chassis of claim 3, wherein the chassis controller is configured to automatically:
  detect the connection of the connected module to a backplane interconnect of a module slot in the plurality of module slots;
  determine if the connected module is a RIM or an OIM; and
  instruct the switch controller to generate the downlink switch selector and the uplink switch selector.

5. The head-end chassis of claim 3, wherein the chassis controller is configured to:
  detect the connection of the connected module to a backplane interconnect of a module slot in the plurality of module slots and determine if the connected module is a RIM or an OIM for each module slot among the plurality of module slots; and
  instruct the switch controller to generate the downlink switch selector and the uplink switch selector corresponding to each module slot among the plurality of module slots, based on whether the connected module is a RIM or an OIM.

6. The head-end chassis of claim 3, each backplane interconnect among the plurality of backplane interconnects further comprises a module ID input configured to interconnect with a module ID output from a RIM or OIM inserted into the module slot associated with the backplane interconnect;
  the chassis controller configured to:
    detect the connection of the connected module to the backplane interconnect of the module slot in the plurality of module slots based on a module ID signal received from the module ID output on the module ID input; and
    determine if the connected module is a RIM or an OIM based on the module ID signal received on the module ID input.

7. The head-end chassis of claim 3, wherein the chassis control is further configured to:
  determine if a backplane interconnect for a module slot among the plurality of module slots is unconnected; and
  if the backplane interconnect for the module slot is unconnected, the chassis controller is further configured to instruct the switch controller to:
    generate the downlink switch selector to cause the downlink switch corresponding to the module slot to couple the backplane downlink input of the unconnected backplane interconnect to the corresponding combiner downlink input; and
    generate the uplink switch selector to cause the uplink switch corresponding to the module slot to couple the backplane uplink output of the unconnected backplane interconnect to the corresponding splitter uplink output.

8. The head-end chassis of claim 3, wherein the chassis control is further configured to:
  determine if a backplane interconnect for a module slot among the plurality of module slots is unconnected; and
  if the backplane interconnect for the module slot is unconnected, the chassis controller is further configured to instruct the switch controller to:
    generate the downlink switch selector to cause the downlink switch corresponding to the module slot to couple the backplane downlink output of the unconnected backplane interconnect to the corresponding splitter downlink output; and
    generate the uplink switch selector to cause the uplink switch corresponding to the module slot to couple the backplane uplink input of the unconnected backplane interconnect to the corresponding combiner uplink input.

9. The head-end chassis of claim 1 provided in an indoor optical fiber-based DAS.

10. A method for interconnecting a connected module in a head-end chassis with head-end equipment in an optical fiber-based distributed antenna system (DAS) comprising:
  detecting a connection of a connected module comprised of a radio interface module (RIM) or an optical interface module (OIM), to a backplane interconnect of a module slot among a plurality of module slots in a head-end chassis;
  determining if the connected module in the module slot is a RIM or an OIM;
  if the connected module in the module slot is determined to be a RIM, coupling the backplane interconnect connected to the RIM to:
    a downlink combiner configured to receive an electrical downlink communications signal from the RIM, combine the received electrical downlink communications signal into an electrical combined downlink communications signal and provide the electrical combined downlink communications signal to a downlink splitter;
    an uplink splitter configured to receive an electrical combined uplink communications signal from an uplink combiner, split the electrical combined uplink communications signal into the plurality of electrical split uplink communications signals, and provide the electrical split communications signal to the RIM; and
  if the connected module in the module slot is determined to be an OIM, coupling the backplane interconnect connected to the OIM to:
    a downlink splitter configured to receive the electrical combined downlink communications signal from the downlink combiner, split the received electrical combined downlink communications signal into an electrical split downlink communications signal, and provide the electrical split downlink communications signal to the OIM; and
    an uplink combiner configured to receive an electrical uplink communications signal from the OIM, combine the received electrical uplink communications signal into the electrical combined uplink communications signal, and provide the electrical combined uplink communications signal to the uplink splitter.

11. The method of claim 10, further comprising automatically:

detecting the connection of the connected module to the backplane interconnect of the module slot among the plurality of module slots in the head-end chassis;

determining if the connected module in the module slot is the RIM or the OIM;

if the connected module in the module slot is determined to be the RIM, coupling the backplane interconnect to the RIM; and if the connected module in the module slot is determined to be the OIM, coupling the backplane interconnect to the OIM.

12. The method of claim 10, further comprising, for each of the plurality of module slots:

detecting the connection of the connected module to the backplane interconnect of the module slot among the plurality of module slots in the head-end chassis;

determining if the connected module in the module slot is the RIM or the OIM;

if the connected module in the module slot is determined to be the RIM, coupling the backplane interconnect to the RIM; and if the connected module in the module slot is determined to be the OIM, coupling the backplane interconnect to the OIM.

13. The method of claim 10, wherein:

detecting the connection of the connected module comprises detecting the connection of the connected module to the backplane interconnect of the module slot in the plurality of module slots based on a module ID signal received from the connected module; and determining if the connected module is a RIM or an OIM based on the module ID signal.

14. The method of claim 10, further comprising:

determining if a backplane interconnect for a module slot among the plurality of module slots is unconnected; and if the backplane interconnect for the module slot is unconnected, coupling the unconnected backplane interconnect to the downlink combiner and the uplink splitter.

15. The method of claim 10, further comprising:

determining if a backplane interconnect for a module slot among the plurality of module slots is unconnected; and if the backplane interconnect for the module slot is unconnected, coupling the unconnected backplane interconnect to the downlink splitter and the uplink combiner.

16. An optical fiber-based distributed antenna system (DAS), comprising:

a central unit, comprising:

a plurality of radio interface modules (RIMs) each configured to:

receive an electrical downlink communications signal;

receive an electrical split uplink communications signal from at least one optical interface module (OIM);

a plurality of OIMs each configured to:

receive an electrical split downlink communications signal;

convert the received electrical split downlink communications signal into an optical split downlink communications signal;

distribute the optical split downlink communications signal to a plurality of remote units;

receive a plurality of optical uplink communications signals from the plurality of remote units;

convert the received plurality of optical uplink communications signals to a plurality of electrical uplink communications signals;

each of the plurality of remote units configured to:

receive the optical split downlink communications signal from the central unit;

convert the received optical split downlink communications signal into an electrical split downlink communications signal;

distribute the electrical split downlink communications signal to at least one client device;

receive an electrical uplink communications signal from the at least one client device;

convert the received electrical uplink communications signal into an optical uplink communications signal; and distribute the optical uplink communications signal to the central unit;

the central unit further comprising a head-end chassis, comprising:

a housing;

a plurality of module slots disposed in the housing, each module slot among the plurality of module slots configured to receive a connected module comprised of a RIM among the plurality of RIMs or an OIM among the plurality of OIMs;

a backplane disposed in the housing, the backplane comprising:

a plurality of backplane interconnects each associated with a module slot among the plurality of module slots, each backplane interconnect among the plurality of backplane interconnects configured to interconnect with the connected module inserted into the module slot associated with the backplane interconnect;

each backplane interconnect among the plurality of backplane interconnects comprises:

a backplane downlink input configured to receive the electrical downlink communications signal from a RIM among the plurality of RIMs;

a backplane downlink output configured to provide an electrical split downlink communications signal to an OIM among the plurality of OIMs;

a backplane uplink input configured to receive an electrical uplink communications signal from the OIM;

a backplane uplink output configured to provide an electrical split uplink communications signal to the RIM;

a downlink combiner comprising a plurality of combiner downlink inputs each corresponding to a backplane interconnect among the plurality of backplane interconnects, the plurality of combiner downlink inputs configured to receive a plurality of electrical downlink communications signals from the plurality of RIMs, combine the received plurality of electrical downlink communications signals into an electrical combined downlink communications signal, and provide the electrical combined downlink communications signal on a combiner downlink output;

a downlink splitter comprising a splitter downlink input configured to receive the electrical combined downlink communications signal from the combiner downlink output, split the received electrical combined downlink communications signal into a plurality of electrical split downlink communications signals, and provide the plurality of electrical split downlink communications signals on a plurality of splitter downlink outputs each corresponding to a backplane interconnect among the plurality of backplane interconnects;

an uplink combiner comprising a plurality of combiner uplink inputs each corresponding to a backplane interconnect among the plurality of backplane interconnects, the plurality of combiner uplink inputs configured to receive a plurality of electrical uplink communications signals from the plurality of OIMs, combine the received plurality of electrical uplink communications signals into an electrical combined uplink communications signal, and provide the electrical combined uplink communications signal on a combiner uplink output;

an uplink splitter comprising a splitter uplink input configured to receive the electrical combined uplink communications signal from the combiner uplink output, split the received electrical combined uplink communications signal into a plurality of electrical split uplink communications signals, and provide the plurality of electrical split uplink communications signals on a plurality of splitter uplink outputs each corresponding to a backplane interconnect among the plurality of backplane interconnects;

a plurality of downlink switches each configured to selectively couple, in response to a downlink switch selector, either the backplane downlink input of a backplane interconnect connected to a RIM, to a corresponding combiner downlink input among the plurality of combiner downlink inputs to provide the electrical downlink communications signal from the RIM to the downlink combiner; or the backplane downlink output of the backplane interconnect connected to an OIM, to a corresponding splitter downlink output among the plurality of splitter downlink outputs to provide the electrical split downlink communications signal to the OIM; and a plurality of uplink switches each configured to selectively couple, in response to an uplink switch selector, either the backplane uplink output of a backplane interconnect connected to the RIM, to a corresponding splitter uplink output among the plurality of splitter uplink outputs to provide the electrical split uplink communications signal to the RIM; or the backplane uplink input of the backplane interconnect connected to the OIM, to a corresponding combiner uplink input among the plurality of combiner uplink inputs to provide the electrical uplink communications signal from the OIM to the uplink combiner.

* * * * *